(12) United States Patent
Takizawa et al.

(10) Patent No.: US 12,184,315 B2
(45) Date of Patent: *Dec. 31, 2024

(54) DEMODULATING APPARATUS, BASE STATION AND DEMODULATING METHOD

(71) Applicant: TOYOTA JIDOSHA KABUSHIKI KAISHA, Toyota (JP)

(72) Inventors: Kenichi Takizawa, Koganei (JP); Masafumi Moriyama, Koganei (JP); Fumihide Kojima, Koganei (JP); Atsushi Kurosawa, Fuchu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,113

(22) Filed: Apr. 3, 2023

(65) Prior Publication Data

US 2023/0308124 A1    Sep. 28, 2023

Related U.S. Application Data

(63) Continuation of application No. 17/712,638, filed on Apr. 4, 2022, now Pat. No. 11,664,838.

(30) Foreign Application Priority Data

Apr. 8, 2021    (JP) .................................. 2021-066070

(51) Int. Cl.
*H04B 1/12* (2006.01)
*H04B 1/00* (2006.01)
*H04B 1/10* (2006.01)

(52) U.S. Cl.
CPC .............. *H04B 1/12* (2013.01); *H04B 1/0039* (2013.01); *H04B 1/1036* (2013.01)

(58) Field of Classification Search
CPC ....... H04B 1/12; H04B 1/0039; H04B 1/1036
See application file for complete search history.

(56) References Cited

U.S. PATENT DOCUMENTS

4,137,427 A  *  1/1979  Choquet ............... H04L 7/0054
                                                   327/155
4,691,176 A  *  9/1987  Hsiung .................... H03L 7/07
                                                    331/25

(Continued)

OTHER PUBLICATIONS

B. Sklar, "Digital Communications: Fundamentals and Applications $2^{nd}$ Edition," (U.S.A.) Prentice Hall, Feb. 2017, pp. 182-185, 194-197.

(Continued)

*Primary Examiner* — Junpeng Chen
(74) *Attorney, Agent, or Firm* — Finnegan, Henderson, Farabow, Garrett, and Dunner, LLP

(57) ABSTRACT

The demodulating apparatus includes circuits of receiving modulated radio signals coming from a plurality of transmission devices, first demodulating a first reception signal DPSK-modulated among the radio signals, modulating demodulation signals into modulation signals based on DPSK, estimating an amplitude and a phase of a propagation signal on a propagation path leading to the reception circuit from the transmission device on the basis of the radio signal and the modulation signal, first generating, based on the variables, a first simulated signal simulating the first reception signal from the modulation signal, extracting a signal obtained by cancelling the first simulated signal from the radio signals, and repeating processes of the first demodulating, the modulating, the estimating, the first generating and the extracting to such a limit as to enable the first demodulating.

12 Claims, 14 Drawing Sheets

(56) References Cited

U.S. PATENT DOCUMENTS

| | | |
|---|---|---|
| 8,744,009 B2 | 6/2014 | Kleider et al. |
| 11,018,799 B1* | 5/2021 | Collins ............... H04L 27/2647 |
| 2003/0043941 A1 | 3/2003 | Johnson et al. |
| 2011/0051215 A1* | 3/2011 | Zhou .................... H04B 10/541 |
| | | 359/238 |
| 2013/0045016 A1* | 2/2013 | Doran .................... H04B 10/66 |
| | | 398/214 |
| 2019/0044557 A1 | 2/2019 | Pearce et al. |
| 2021/0119846 A1* | 4/2021 | Landis .................. H04L 5/0048 |

OTHER PUBLICATIONS

Moriyama et al., "Experimental Evaluation of a Novel Up-Link NOMA System for IoT Communication Equipping Repetition Transmission and Receive Diversity" IEICE Trans. Commun, Aug. 2019 vol. E102-B, No. 8, pp. 1467-1476.

* cited by examiner

FIG.8

| PARAMETER | VALUE |
|---|---|
| NUMBER OF TERMINALS | 2 |
| MODULATION METHOD | * SINGLE CARRIER SYNCHRONOUS DETECTION QPSK<br>* SINGLE CARRIER DIFFERENTIAL CODING DQPSK |
| ERROR CORRECTION CODE | CONVOLUTIONAL CODE HAVING CONSTRAINT LENGTH 6 AND CODED RATE 1/3 |
| INTER-TERMINAL POWER RATIO SIR | 3 dB |
| MOVING SPEED<br>MAXIMUM DOPPLER FREQUENCY fd,<br>SYMBOL PERIOD T | $f_d T = 0.0005 \sim 0.0008$ |
| SIGNAL-TO-NOISE POWER RATIO SNR | 30dB |
| INFORMATION BIT NUMBER | 128 BITS |

FIG.10

| PARAMETER | VALUE |
|---|---|
| NUMBER OF TERMINALS | 2 |
| MODULATION METHOD | *SINGLE CARRIER SYNCHRONOUS DETECTION QPSK<br>*SINGLE CARRIER DIFFERENTIAL CODING DQPSK |
| ERROR CORRECTION CODE | CONVOLUTIONAL CODE HAVING CONSTRAINT LENGTH 6 AND CODED RATE 1/3 |
| INTER-TERMINAL POWER RATIO SIR | 2~5dB |
| MOVING SPEED | STAY STATIC (0km/h) |
| SIGNAL-TO-NOISE POWER RATIO SNR | 30dB |
| INFORMATION BIT NUMBER | 128 BITS |

…

DEMODULATING APPARATUS, BASE STATION AND DEMODULATING METHOD

CROSS REFERENCE TO THE RELATED APPLICATION

This application is a continuation of U.S. patent application Ser. No. 17/712,638, filed Apr. 4, 2022, which claims the benefit of Japanese Patent Application No. 2021-066070, filed on Apr. 8, 2021, each of which is hereby incorporated by reference herein in its entirety.

BACKGROUND

Technical Field

The present invention pertains to a demodulating apparatus, a base station and a demodulating method.

Description of the Related Art

A number of terminals connected to wireless communication networks is predicted to increase from now on. This causes apprehension about tight situations of uplinks. Under such circumstances, it is anticipated to exploit a technology to relax orthogonality of radio signals for the purpose of increasing the number of terminals connectable on the uplink. This technology is called Power Domain-Uplink-Non-Orthogonal Multiple Access (PD-UL-NOMA) making use of a power difference on the uplink.

FIG. 1 illustrates a situation of radio signals in a wireless communication network to which PD-UL-NOMA is applied. Resources allocated to a terminal are depicted in an upper portion of FIG. 1. The same resources of the uplink are allocated in overlap to a plurality of terminals in PD-UL-NOMA.

Note that reference signals are transmitted and received between a base station and the terminals for the purpose of estimating a propagation path and synchronization between station and the terminals in the wireless communication network. Plural reference signals are also orthogonal in PD-UL-NOMA. For example, in time division multiplexing communications, data signals are overlapped on a time base, whereas the reference signals get separated and orthogonal. The reference signals are thus used, whereby tolerance against inter-terminal interference signals and noises is improved, though communication procedures get complicated.

However, accuracy of estimating a radio wave propagation path affects a success rate (or error rate) of the communications in PD-UL-NOMA. Especially in an environment where the terminals move fast, a fluctuation speed of the propagation path of radio waves becomes fast, and hence communication technologies following up the fluctuation speed are desired.

By the way, conventional wireless communication networks have exploited, e.g., Phase Shift Keying (PSK) by way of a modulation method so far. PSK is roughly classified into coherent PSK (CPSK) and differential PSK (DPSK). In terms of the tolerance against the interference signals or the noises, CPSK is superior to DPSK. Therefore, CPSK is widely exploited in the conventional wireless communications.

[Non-Patent Document 1] B. Sklar "Digital Communications: Fundamentals and Applications 2nd Edition," (U.S.A.) Prentice Hall, February 2017

[Non-Patent Document 2] Moriyama, et al. "Experimental Evaluation of a Novel Up-Link NOMA System for IoT Communication Equipping Repetition Transmission and Receive Diversity" IEICE TRANS. COMMUN. August 2019 Vol. E102-B, No. 8.

SUMMARY

However, CPSK is based on a premise that a receiving station synchronizes with a standard signal with the aid of a reference signal, of which procedures are complicated. Therefore, communications in CPSK are easily affected by fluctuations when the fluctuations of a propagation path of radio waves are fast. Under such circumstances, it is an aspect of the present disclosure to provide a communication method capable of following up the fluctuations of the propagation path of the radio waves.

An embodiment of the disclosure will be exemplified by a demodulating apparatus. The demodulating apparatus includes a reception circuit to receive modulated radio signals coming from a plurality of transmission devices, a first demodulation circuit to demodulate a first reception signal modulated based on differential phase shift keying among the modulated radio signals received by the reception circuit, a modulation circuit to modulate a demodulation signal demodulated by the first demodulation circuit into a modulation signal based on differential phase shift keying, an estimation circuit to estimate variations of an amplitude and a phase of a propagation signal on a propagation path leading to the reception circuit from one of the plurality of transmission devices on the basis of the radio signal and the modulation signal modulated by the modulation circuit, a first generation circuit to generate, based on the variations estimated by the estimation circuit, a first simulated signal simulating the first reception signal from the modulation signal, a cancellation circuit to extract a signal obtained by cancelling the first simulated signal from the modulated radio signals received by the reception circuit; and a first control circuit to repeat processes of the first demodulation circuit, the modulation circuit, the estimation circuit, the first generation circuit and the cancellation circuit to such a limit as to enable the first demodulation circuit to demodulate.

The present demodulating apparatus is capable of providing communications with a moving station by the communication method enabling follow-up for the fluctuations of the propagation path of the radio waves.

BRIEF DESCRIPTION OF THE DRAWINGS

FIG. 8 is a chart depicting parameters set in a simulation;

FIG. 10 is a chart depicting the parameters set in another simulation;

DESCRIPTION OF THE EMBODIMENTS

Figure 1:
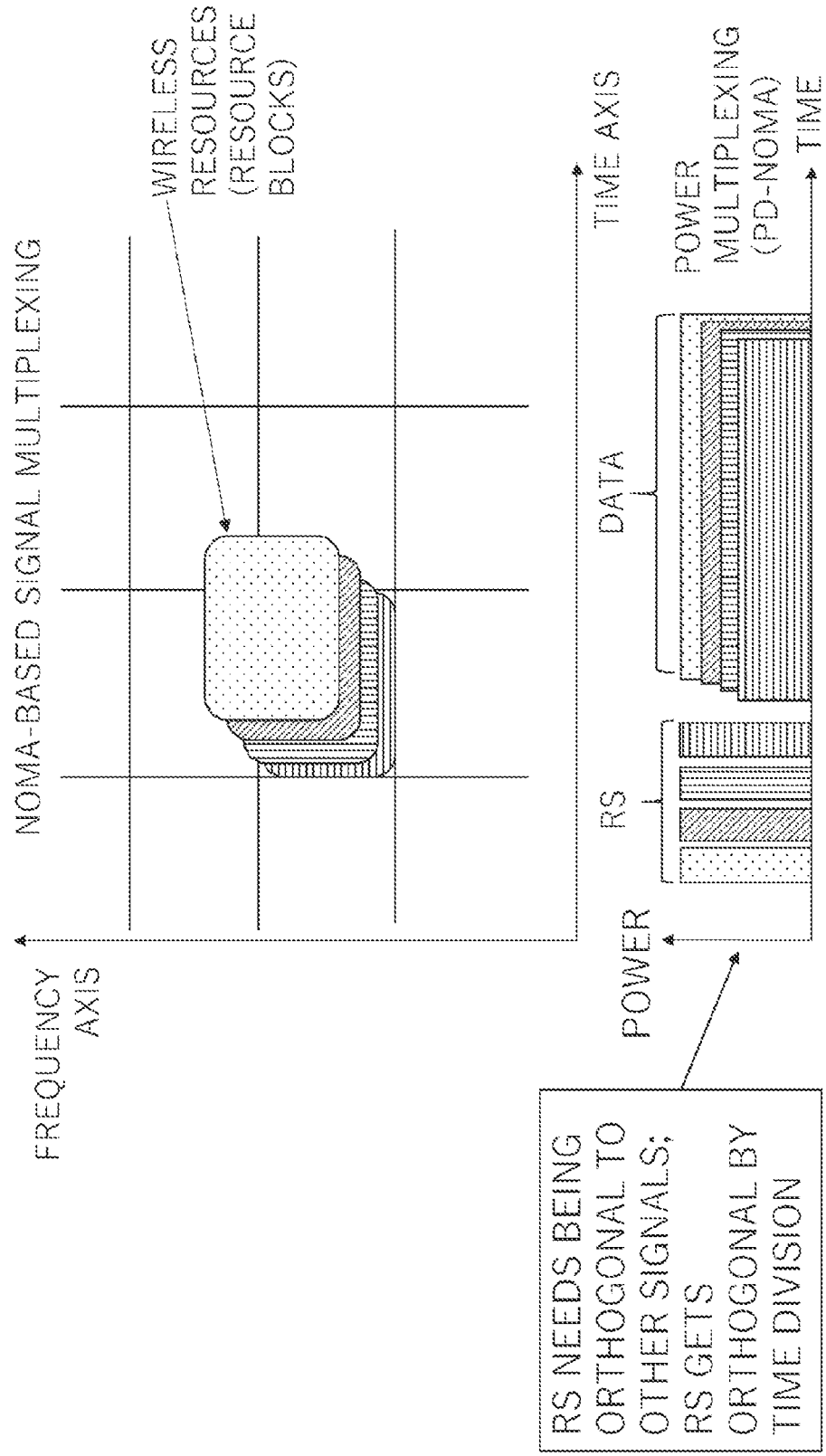
FIG. 1 is a diagram illustrating a situation of radio signals in a wireless communication network to which PD-UL-NOMA is applied.

A wireless communication system 100 and a demodulating method in this wireless communication system according to one embodiment will hereinafter be described with reference to drawings. The wireless communication system 100 includes a base station 10. The base station 10 includes a demodulating apparatus. The demodulating apparatus includes a reception circuit that receives modulated radio signals coming from a plurality of transmission devices. The reception circuit receives and converts the radio signals into electric signals. The reception circuit is exemplified by a high frequency circuit including an antenna.

The demodulating apparatus includes a first demodulation circuit that demodulates first reception signals, which are modulated based on differential phase shift keying (DPSK), among the radio signals received by the reception circuit. Namely, the first demodulation circuit performs the differential phase demodulation. The first reception signals are, e.g., the radio signals that are modulated based on differential phase shift keying by a certain transmission device.

The demodulating apparatus includes a modulation circuit to modulate demodulation signals demodulated by the first demodulation circuit into modulation signals based on differential phase shift keying. In other words, the modulation circuit, as described above, restores transmission signals of a source transmission device from DPSK-demodulated data.

The demodulating apparatus includes an estimation circuit that estimates, based on the radio signals received by the reception circuit and the modulation signals modulated by the modulation circuit, variation amounts of an amplitude and a phase of a propagation signal on a propagation path leading to the reception circuit from one of the plurality of transmission devices. The variation amounts of the amplitude and the phase of the propagation signal on the propagation path can be also said to be a transfer function representing a degree of influence by fading and other equivalent phenomena on the propagation path.

The demodulating apparatus includes a first generation circuit to generate, based on the variation amounts estimated by the estimation circuit, first simulated signals simulating the first reception signals. The variation amounts can be said to be the transfer function representing the degree of influence by fading and other equivalent phenomena on the propagation path, and hence it is feasible to simulate the first reception signal reaching the reception circuit by multiplying the modulation signal by the variation amount.

The demodulating apparatus includes a cancellation circuit that extracts signals obtained by cancelling the first simulated signals from the radio signals received by the reception circuit. As stated above, the first simulated signals are the signals simulating the first reception signals. Interferences caused by the first reception signals are therefore cancelled with respect to the signals obtained by cancelling the first simulated signals from the radio signals received by the reception circuit. To be specific, the cancellation circuit cancels the interferences caused by the transmission signals transmitted from the first transmission device. This cancellation enables demodulation of the reception signals from the transmission devices other than the first transmission device.

The demodulating apparatus includes a first control circuit that iterates processes of the first demodulation circuit, the modulation circuit, the estimation circuit and the first generation circuit to such an extent as to enable the demodulation by the first demodulation circuit. The demodulating apparatus iterates these processes and is thereby enabled to cancel the interferences caused by the transmission signals coming from the plurality of transmission devices while acquiring the reception signals from the plurality of transmission devices sequentially such as the first transmission device and the second transmission device. The demodulating apparatus is thus enabled to separate the signals received from the individual transmission devices out of the signals in which the transmission signals coming from the plurality of transmission devices are mingled.

First Embodiment

Communication System

Figure 2:
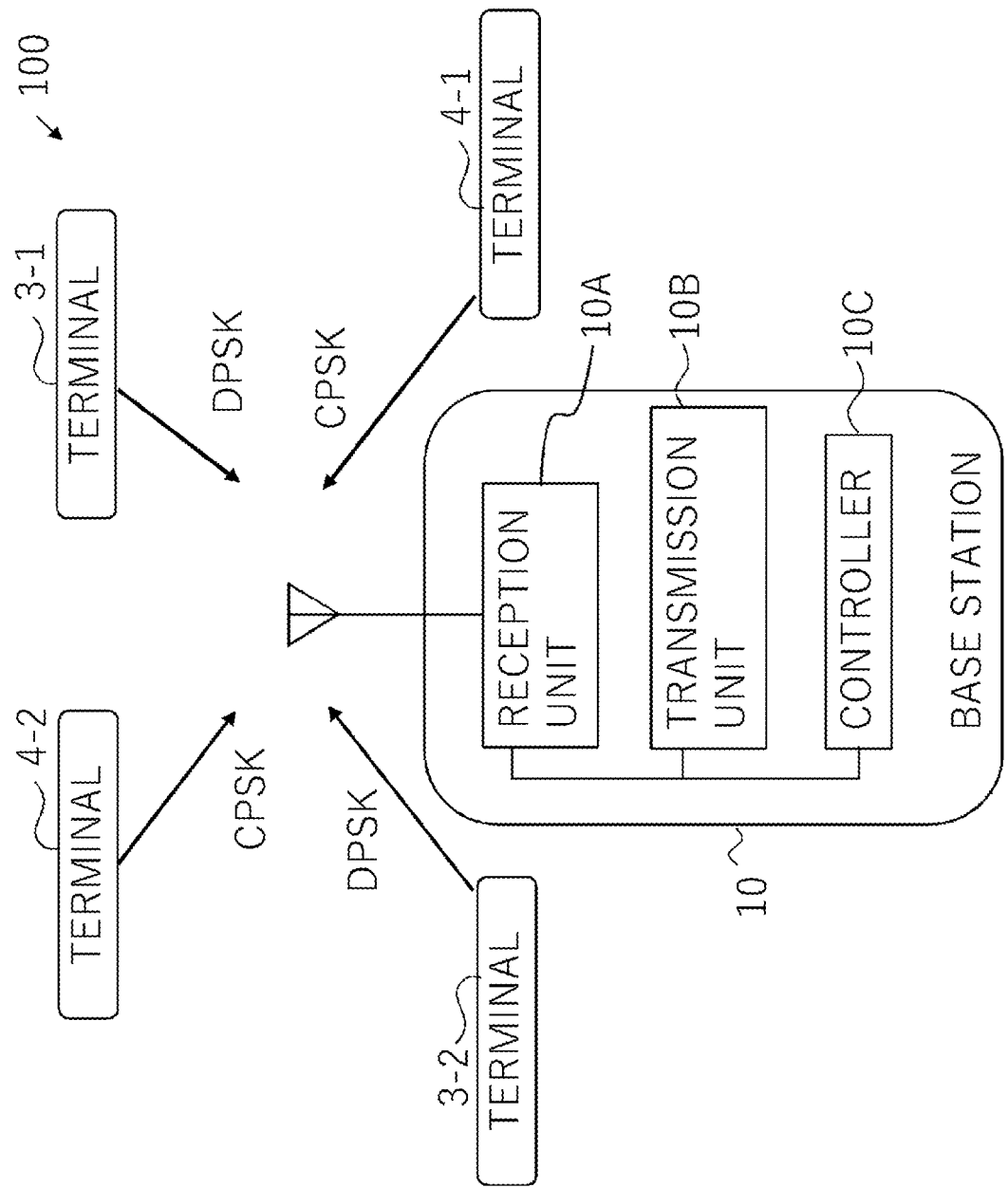
FIG. 2 is a diagram illustrating a configuration of the wireless communication system according to the embodiment.

A wireless communication system 100 according to a first embodiment will hereinafter be described with reference to FIGS. 2 through 5. FIG. 2 is a diagram illustrating a configuration of the wireless communication system 100 according to the embodiment. The wireless communication system 100 includes a base station 10, wireless terminals 3-1, 3-2 and wireless terminals 4-1, 4-2 in an example of FIG. 2. The wireless terminals 3-1, 3-2 among these terminals perform DPSK-based communications with the base station 10. On the other hand, the wireless terminals 4-1, 4-2 perform CPSK-based communications with the base station 10. The wireless communication system 100 thus enables the base station 10 to establish simultaneous connections with two groups of the wireless terminals 3-1, 3-2 performing the DPSK-based communications and the wireless terminals 4-1, 4-2 performing the CPSK-based communications.

The wireless terminals 3-1, 3-2 may be configured as wireless terminals dedicated to DPSK and may also be configured as wireless terminals usable for both of DPSK and CPSK. The wireless terminals 3-1, 3-2 are usable for both of DPSK and CPSK, in which case the wireless terminals 3-1, 3-2 have access to the base station 10 through any one of DPSK and CPSK for the first time when connecting to the base station 10. Any one of the base station 10 and the wireless terminals 3-1, 3-2 determines switchover of the communication method in accordance with circumstances. The wireless terminals 3-1, 3-2 and the base station 10 communicate with each other by the thus-determined communication method. It does not mean that a number of the wireless terminals 3-1, 3-2 is limited to "2". FIG. 2 is just one example. In the first embodiment, a subsequent modified example thereof and a second embodiment, the wireless terminals 3-1, 3-2 are, when generically termed, simply referred to as "wireless terminals 3". As described above, in the first embodiment, the wireless terminals 3 are the wireless terminals performing the DPSK-based communications.

The wireless terminals 4-1, 4-2 may be configured as wireless terminals dedicated to CPSK and may also be configured as wireless terminals usable for both of CPSK and DPSK. The wireless terminals 4-1, 4-2 are usable for both of DPSK and CPSK, in which case the wireless terminals 4-1, 4-2 have access to the base station 10 through any one of CPSK and DPSK for the first time when connecting to the base station 10. Any one of the base station 10 and the wireless terminals 4-1, 4-2 determines the switchover of the communication method in accordance with the circumstances. The wireless terminals 4-1, 4-2 and the base station 10 communicate with each other by the thus-determined communication method. It does not mean that the number of the wireless terminals 4-1, 4-2 is limited to "2". In the first embodiment, the subsequent modified example thereof and the second embodiment, the wireless terminals 4-1, 4-2 are, when generically termed, simply referred to as "wireless terminals 4". As stated above, in the first embodiment, the wireless terminals 4 are the wireless terminals performing the CPSK-based communications.

As in FIG. 2, the base station 10 includes a reception unit 10A, a transmission unit 10B and a control device 10C. the reception unit 10A receives uplink signals based on PD-UL-NOMA from the plurality of wireless terminals 3, 4. The reception unit 10A has a DPSK demodulation circuit and a CPSK demodulation circuit and is therefore capable of receiving both of CPSK modulated signals and DPSK modulated signals. The transmission unit 10B transmits the radio signals to the wireless terminals 3, 4. The controller 10C controls the reception unit 10A and the transmission unit 10B. The controller 10C controls, e.g., operations of the DPSK demodulation circuit and the CPSK demodulation circuit of the reception unit 10A. The controller 10C includes a Central Processing Unit (CPU) and a memory. The CPU executes processes based on computer programs deployed in an executable manner on the memory.

CPSK is defined as a modulation method widely used in, e.g., Long Term Evolution (LTE) and other equivalent telecommunication standards. Use of CPSK involves transmitting reference signals (RS) separately. The reference signals to be transmitted are orthogonal to other signals. In PD-UL-NOMA, the CPSK method has problems given as follows.

Problems of CPSK Modulation Method (1) In the CPSK method, when a number of overlaps of NOMA increases, this increase leads to a rise in ratio of how much the reference signals occupy wireless resources, thereby hindering an improvement of transmission efficiency.
(2) When a fading speed is high, there exists a possibility that an estimated value of the propagation path, which is measured based on the reference signal, is not valid.
(3) The wireless terminal 4 is unable to transmit the signal till the base station 10 allocates the reference signal thereto, and hence this vacant period is a delay. When the allocated reference signal is overlapped with the reference signals of other wireless terminals 4, a QoS (Quality of Service) deteriorates.

Such being the case, the first embodiment proposes a solution against the problems of CPSK by using DPSK. For example, the base station 10 uses DPSK together with CPSK, thereby solving the problems given above. The combined use of CPSK and DPSK enables combinations of advantages of both of DPSK and CPSK as will hereinafter be described. Note that the DPSK method is, it is considered, also exploited under specific conditions in place of the CPSK method in PD-UL-NOMA in addition to the combined use of CPSK and DPSK.

Advantages of DPSK-Based Transmission (1) The wireless resources for the reference signals are not needed. The reference signals are required to be orthogonal, and CPSK consumes a great quantity of wireless resources for the reference signals. By contrast, DPSK does not need the reference signals. The wireless resources for the reference signals can be thereby allocated to data.
(2) It is feasible to reduce influences of errors, caused by fast fading, of the estimated values on the propagation path. A fading fluctuation is faster than a certain limit, in which case such a possibility exists that accuracy of the propagation path estimated value measured by using the reference signal is not sufficient. In this case, a CPSK error rate deteriorates. DPSK does not need the propagation path estimation using the reference signal, and the influences of the fast fading are decreased.
(3) A low delay is accomplished by DPSK. To be specific, DPSK enables the transmission without any negotiations between the base station and the wireless terminals for allocating the reference signals. Accordingly, there is no communication delay caused by the negotiations.

Advantages of CPSK-Based Transmission (1) CPSK makes it feasible to grasp the transmission terminals. Specifically, CPSK enables the base station 10 to grasp a number of connections and pieces of identifying information (ID) of the transmission terminals before demodulation, depending on whether there are the received reference signals.
(2) It is feasible in CPSK to decrease a signal-to-interference noise power ratio (SINR) for obtaining a same bit error rate. In other words, CPSK is higher in tolerance against the interferences and noises than DPSK. It is therefore feasible in CPSK to increase a number of the overlap-enabled terminals.
(3) CPSK facilitates generation of a replica in a loop according to Successive Interference Canceller (SIC). CPSK, in which the propagation path estimated value is obtained from the reference signal, facilitates the generation of the replica accordingly. By contrast, DPSK, in which the reference signals are not transferred and received, requires a special process that will be described in the first embodiment in order to acquire the propagation path estimated value for generating the replica for cancelling the interference.

Figure 3:
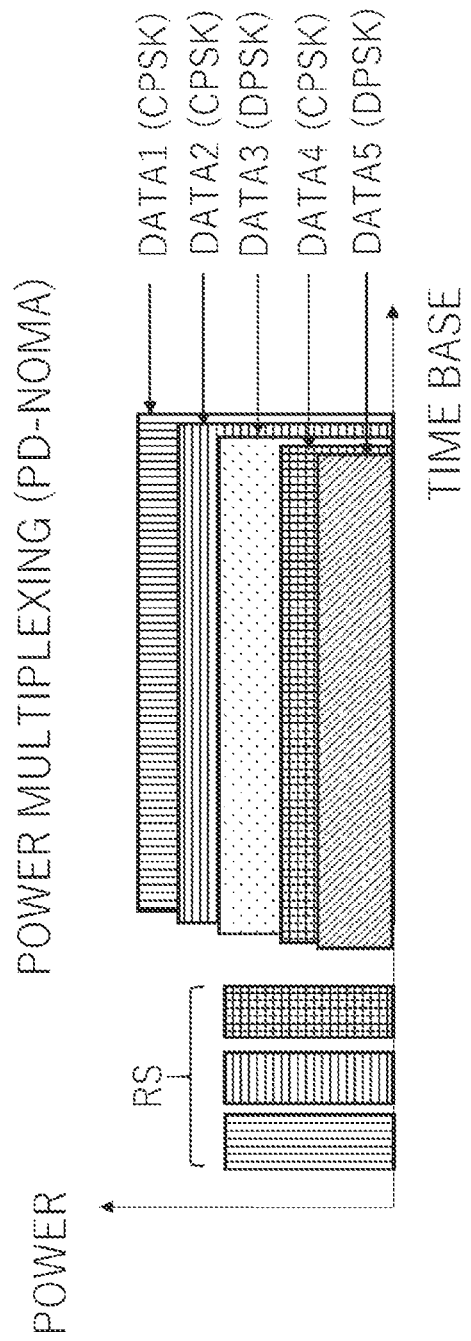
FIG. 3 is a diagram illustrating a configuration of wireless resources in the wireless communication system according to the embodiment.

FIG. 3 illustrates a configuration of the wireless resources in the wireless communication system 100 according to the embodiment. In the example of FIG. 3, the reference signals (RS) are separated and get orthogonal on a time base. On the other hand, data signals (DATA1 through DATA5) are overlapped with each other on the time base. Among these data signals, the radio signals of CPSK are DATA1, DATA2 and DATA4. The radio signals of DPSK are DATA3 and DATA5. As in FIG. 3, the first embodiment adopts a system in which the DPSK signals are not overlapped with the wireless resources of the reference signals. With this configuration, the reference signals used in CPSK are not affected by the DPSK signals. In the resource allocation as in FIG. 3, the signal-to-interference noise power ratio (SINR) required for demodulating the DPSK signal needs being set larger than that of the CPSK signal.

Accordingly, the base station 10 demodulates the CPSK radio signals of DATA1 and DATA2 previously and cancels the interferences thereof in the example of FIG. 3. Thereafter, the base station 10 demodulates the DPSK radio signal of DATA3 and cancels the interference thereof. The base station 10 further demodulates the CPSK radio signal of DATA4 and cancels the interference thereof. Finally, the base station 10 demodulates the DPSK radio signal of DATA5.

In the first embodiment, however, the base station 10 causes a DPSK demodulation unit and a CPSK demodulation unit to operate in parallel. The DPSK demodulation unit and the CPSK demodulation unit operate independently of each other, then preferentially demodulate the signals having the higher signal-to-interference noise power ratio (SINR), and cancel the interferences. Accordingly, for instance, as in FIG. 3, the demodulation by the DPSK demodulation unit results in an error in a state of not cancelling the interferences of DATA1 and DATA2. After the CPSK demodulation unit cancels the interferences of DATA1 and DATA2, the DPSK demodulation unit is thereby enabled to demodulate the DPSK signal of DATA3. The resource configuration and the demodulation procedures described above enable the base station 10 to demodulate the respective pieces of data from the DPSK-CPSK mingled reception signals by establishing simultaneous connections to both of the wireless terminals 3-1, 3-2 performing the DPSK-based communications and the wireless terminals 4-1, 4-2 performing the CPSK-based communications.

(Configuration)

Figure 4:
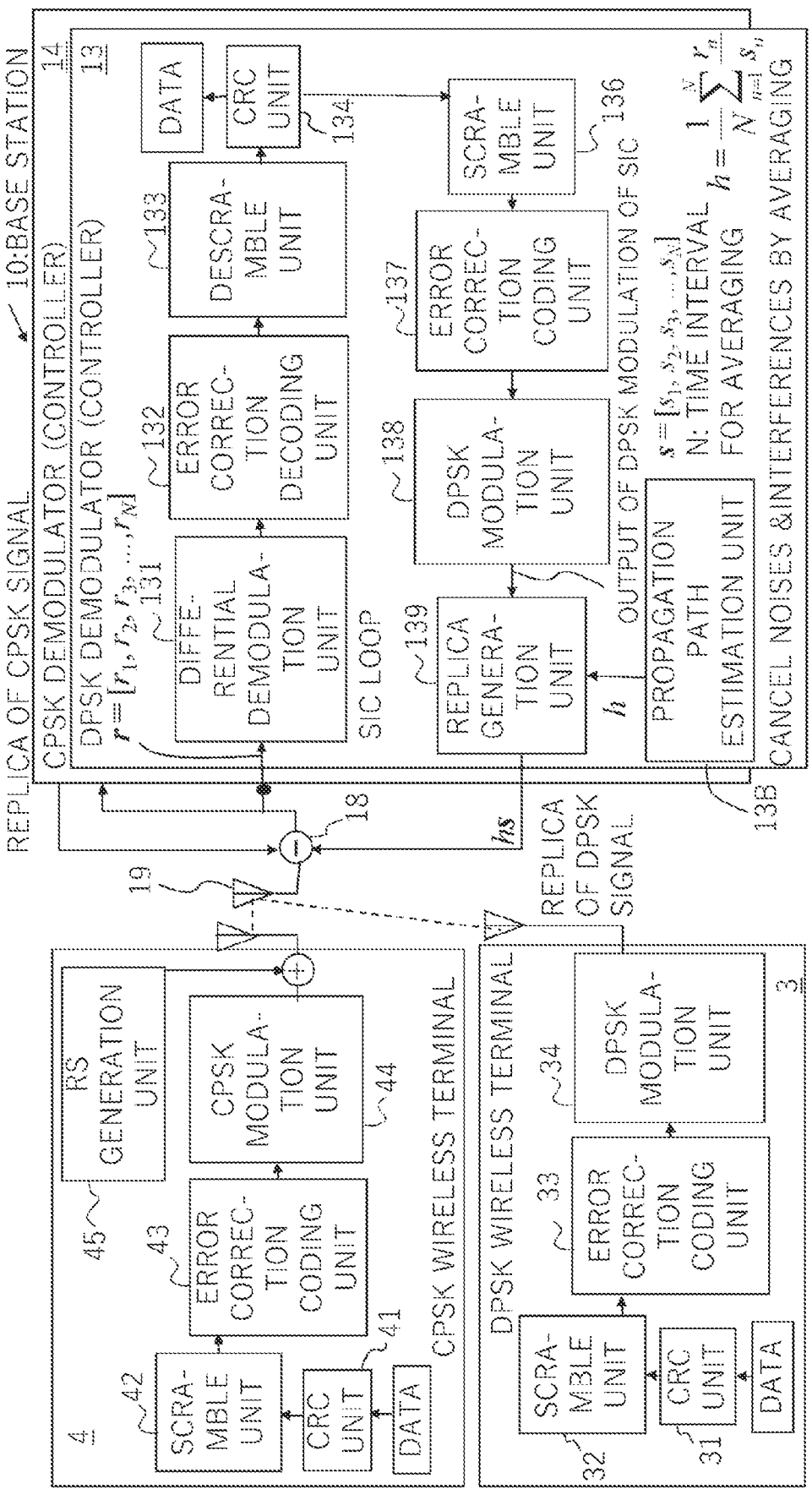
FIG. 4 is a diagram illustrating a detailed configuration of a DPSK demodulation unit of a base station.
Figure 5:
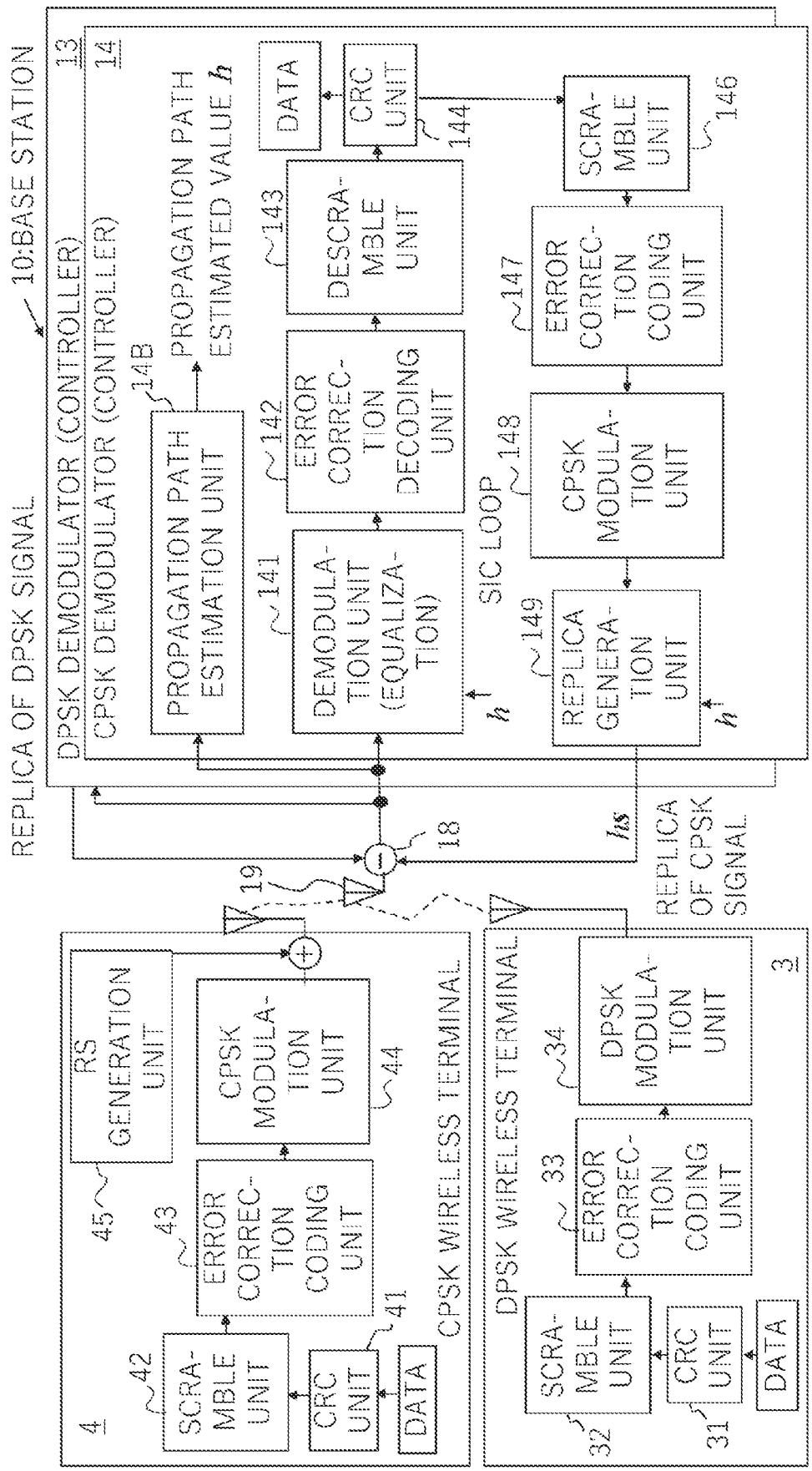
FIG. 5 is a diagram illustrating a detailed configuration of a CPSK demodulation unit of the base station.

FIGS. 4 and 5 illustrate a configuration of the wireless communication system 100 according to the embodiment. FIGS. 4 and 5 depict the wireless terminals 3 and the wireless terminals 4 altogether. As already stated, the wireless terminals 3 are the wireless terminals performing the DPSK-based communications. The wireless terminals 4 are the wireless terminals performing the CPSK-based communications. Of these diagrams, FIG. 4 gives an in-depth illustration of a configuration of a DPSK demodulator 13 of the base station 10. FIG. 5 gives a detailed illustration of a configuration of a CPSK demodulator 14 of the base station 10.

As in FIG. 4, the wireless terminal 3 includes a CRC unit 31, a scramble unit 32, an error correction coding unit 33 and a differential phase shift keying modulation unit (DPSK) modulation unit 34. A CPU of the wireless terminal 3 provides these respective units. The CPU executes processes of the respective unit by computer programs deployed in the executable manner on the memory. The CRC unit 31 adds an error detection code of Cyclic Redundancy Check (CRC) to the data transmitted from the wireless terminal 3. The scramble unit 32 randomizes error-detection-coded data in a pseudo manner, and thus reduces occurrences of regular bit patterns. The randomized bit pattern obviates a symbol bias. As a result, for example, an averaging performance during a propagation path estimation is improved.

The error correction coding unit 33 error-correction-codes the scrambled data. The DPSK modulation unit 34 DPSK-modulates the error-correction-coded data. The DPSK-modulated data are transmitted to the base station 10 from a transmission antenna.

The wireless terminal 4 includes a CRC unit 41, a scramble unit 42, an error correction coding unit 43, a coherent phase shift keying (CPSK) modulation unit 44 and a RS (Reference Signal) generation unit 45. Processes of the CRC unit 41, the scramble unit 42 and the error correction coding unit 43 among these units are the same as those of the CRC unit 31, the scramble unit 32 and the error correction coding unit 33 of the wireless terminal 3. The CPSK modulation unit 44 CPSK-modulates the error-correction-coded data. The RS generation unit 45 generates the reference signals. The generated reference signals are transmitted together with the CPSK-modulated data to the base station 10.

As in FIGS. 4 and 5, the base station 10 includes a DPSK demodulator 13, a CPSK demodulator unit 14, antenna 19 and a replica cancellation unit 18. The base station 10 operates the DPSK demodulator 13 and the CPSK demodulator 14 in parallel, whereby the DPSK demodulator 13 and the CPSK demodulator 14 respectively demodulate the reception signals coming from the antenna 19.

The antenna 19 receive the modulated radio signals coming from the plurality of transmission devices. The antenna 19 and a circuit connected thereto may be said to be "a reception circuit to execute a reception". As illustrated in FIG. 3, the reference signals are orthogonal among the reception signals. While on the other hand, the data signals are overlapped in a resource block (e.g., on the time base) without any distinctions between the DPSK signals and the CPSK signals. The DPSK demodulator 13 sequentially extracts, based on a SIC method, the signals of the DPSK method from the reception signals. To be specific, the DPSK demodulator 13 sequentially demodulates the reception signals of DATA3 and DATA5 among the reception signals carrying DATA1 through DATA5 illustrated in, e.g., FIG. 3. As described in FIG. 3, for instance, the DPSK demodulator 13 does not succeed in the demodulation till the DPSK signal of DATA3 in FIG. 3 becomes a signal having the signal-to-interference noise power ratio (SINR) necessary for the demodulation. Hence, the DPSK demodulator 13 demodulates the DPSK signal of DATA3 after cancelling the interferences of DATA1 and DATA2.

Therefore, replica cancellation unit 18 includes a buffer to retain the signal (data) before the replica is cancelled, and a subtractor that cancels the replica from the signal retained in the buffer and writes the signal, from which the replica is cancelled, again back to the buffer. With such a configuration, the replica cancellation unit 18 successively cancels the replicas based on the decoded data given from the plurality of wireless terminals 3, 4 out of the radio signals received by the antenna 19. In a SIC loop, the replica cancellation unit 18 successively cancels the replicas in sequence from those exhibiting the higher signal-to-interference noise power ratio (SINR).

As in FIG. 4, the DPSK demodulator 13 includes a differential demodulation unit 131, an error correction decoding unit 132, a descramble unit 133, a CRC unit 134, a scramble unit 136, an error correction coding unit 137, a differential phase shift keying (DPSK) modulation unit 138, a replica generation unit 139, and a propagation path estimation unit 13B. The respective units starting with the differential demodulation unit 131 and ending with the replica cancellation unit 18 forms the SIC loop for carrying out the SIC method.

The DPSK demodulator 13 demodulates the DPSK-modulated reception signals in sequence from a first reception signal exhibiting the highest signal-to-interference noise power ratio (SINR) in the SIC loop. Among the units described above, the differential demodulation unit 131 DPSK-demodulates the reception signals received by the antenna 19. The differential demodulation unit 131 detects a shift quantity of the phase of the reception signal received this time from the phase of the reception signal received last time. However, the reception signal received this time is, as illustrated in FIG. 3, mingled with the interference signals of the plurality of terminals. The reception signals are overlapped with noises. It therefore follows that the differential demodulation unit 131 processes the plurality of reception signals exhibiting the phases with the different shift quantities from the phase of the reception signal received last time. The differential demodulation unit 131 detects the phase shift quantity initially from the strongest reception signal among the plural reception signals exhibiting the phases with the different shift quantities. For example, the differential demodulation unit 131 demodulates the DPSK reception signal of DATA3 after cancelling the interferences of DATA1 and DATA2 in FIG. 3.

The error correction decoding unit 132 error-correction-decodes the demodulated data. The descramble unit 133 descrambles and thus returns the error-correction-decoded data to the pre-scrambling bit string. The CRC unit 134 carries out a CRC-based error detection with the descrambled data. The data, which is normal in terms of error detection result of the CRC unit 134, is sent to a higher layer of the base station 10 and also handed over to the scramble unit 136. A configuration made by the differential demodulation unit 131 through the CRC unit 134 among the units described above may be said to be "a first demodulation circuit to execute a first demodulation" because of demodulating the first DPSK-modulated reception signal and handing over this demodulated reception signal to the higher layer of the base station 10. Among the reception signals received by the antenna 19, the reception signal to be demodulated at this time is to be termed "the first reception signal".

Note that the CRC unit 134 carries out the error detection but does not cancel the CRC-based error detection code in the first embodiment. The CRC unit 134 may cancel the detection code, in which case the circuit may simply be connected such that the data descrambled by the descramble unit 133 is handed over to the scramble unit 136 after processing of the CRC unit 134 for detecting an error. A circuit to add again the CRC-based error detection code may be provided posterior to the CRC unit 134 but anterior to the scramble unit 136.

The scramble unit 136, the error correction coding unit 137 and the DPSK modulation unit 138 perform again scrambling, error-correction coding and DPSK modulating on the basis of the data determined to have no error in the error detection of the CRC unit 134. The DPSK modulated data for effecting SIC are thereby generated. The scramble unit 136, the error correction coding unit 137 and the DPSK modulation unit 138 may therefore be said to be "a modulation circuit to execute modulating a demodulated signal into a modulation signal based on differential phase shift keying".

The propagation path estimation unit 13B calculates a propagation path estimated value h from the reception signal received by the antenna 19 and the DPSK modulated signal outputted from the DPSK modulation unit 138. The propagation path estimated value h may be said to be an amplitude and also a phase shift quantity of the propagated signal on the propagation path leading to the antenna 19 from each wireless terminal 3. The propagation path estimation unit 13B may therefore be said to be "an estimation circuit to execute estimating an amplitude and a phase shift quantity of the propagated signal on the propagation path".

The reception signals received by the reception antenna 19 contain the reception signals coming from the plurality of wireless terminals. The reception signals received by the reception antenna 19 also contain noises. Such being the case, the propagation path estimation unit 13B averages the propagation path estimated values h in a plurality of periods for which the reception signals are received. To be specific, the propagation path estimation unit 13B uses DPSK modulation data [s1, s2, s3, . . . , sN] outputted by the DPSK modulation unit 138 on the basis of reception signals [r1, r2, r3, . . . , rN] in the plurality of periods that are obtained by the antenna 19 and the data decoded based on these reception signals. The propagation path estimation unit 13B averages propagation path estimated values $h_n = r_n/s_n$ (n=1, 2, 3, . . . , N) calculated therefrom. Averaging serves to cancel the nearly random interference signals and noises contained in the reception signals received by the antenna 19 and coming from the wireless terminals other than the demodulation target terminals.

The replica generation unit 139 generates a replica of the DPSK signal, based on the propagation path estimated value h generated by the propagation path estimation unit 13B. The replica is defined as a simulated signal simulating the DPSK modulated signal (the first reception signal described above) received by the antenna 19 and having maximum electric power. In other words, the replica is the DPSK modulated signal arriving at the antenna 19 from one unspecified wireless terminal 3 as well as being a signal simulating the signal having the highest signal-to-interference noise power ratio (SINR). The replica of the DPSK signal is herein called "a first simulated signal". The replica generation unit 139 may be said to be "a first generation circuit to execute generating the first simulated signal simulating the first reception signal".

The replica cancellation unit 18 cancels the replica of the DPSK signal in a first cancellation from the data received by the antenna 19. In the example of FIG. 4, the simulated signal corresponding to the DPSK modulated signal having the maximum electric power is cancelled from the reception signal in the SIC loop.

The DPSK demodulator 13 iterates the SIC loop till the data with no error in the error detection of the CRC unit 134 cannot be obtained from the reception signals. The DPSK demodulator 13 thus demodulates the DPSK reception signals from the signals into which the DPSK reception signals coming from the plurality of wireless terminals are mingled with the CPSK reception signals coming therefrom. Specifically, the DPSK demodulator 13 demodulates the DPSK reception signals coming from the individual wireless terminals 3 performing the DPSK-based communications, and hands over the demodulated signals to the higher layer of the base station 10. For example, the controller 10C of the base station 10 including the CPU executes the processes of the respective units of the DPSK demodulator 13 and controls the SIC loop. The CPU of the base station 10, which executes the processes by way of the DPSK demodulator 13, may be called "a first control circuit repeating the processes" as the case may be. However, the DPSK demodulator 13 may include a CPU to control the SIC loop.

As in FIG. 4, the signals, obtained by cancelling the simulated signals corresponding to the DPSK modulated signals having the maximum electric power from the reception signals in the SIC loop, are returned again to the SIC loop and handed over to the CPSK demodulator 14. As in FIG. 5, the CPSK demodulator 14 includes a demodulation unit 141, an error correction decoding unit 142, a descramble unit 143, a CRC unit 144, a scramble unit 146, an error correction coding unit 147, a coherent phase shift keying (CPSK) modulation unit 148, a replica cancellation unit 149, and a propagation path estimation unit 14B. The CPSK demodulator 14 demodulates the CPSK-modulated reception signals in the processes of the respective units.

The propagation path estimation unit 14B among these units calculates the propagation path estimated values between the wireless terminals 4 and the antenna 19 on the basis of the reference signals transmitted from the wireless terminals 4. In FIG. 5, the respective units starting with the demodulation unit 141 and ending with the replica cancellation unit 18 forms the SIC loop for carrying out the SIC method.

The demodulation unit 141 executes an equalizing process with respect to the reception signals received by the antenna 19, and extracts the reception signals coming from the wireless terminals each performing the CPSK-based communications. To be specific, the demodulation unit 141 extracts, by the equalizing process, the reception signals coming from the specified wireless terminals 4 on the basis of the propagation path estimated values h generated by the propagation path estimation unit 14B between the respective wireless terminals 3, and demodulates the extracted reception signals. The equalizing process involves extracting the reception signals from the corresponding wireless terminals 4 on the basis of the propagation path estimated values h between the antenna 19 and each of the wireless terminals 4 but suppressing the reception signals coming from other wireless terminals.

The error correction decoding unit 142 error-correction-decodes the demodulated data. The descramble unit 143 descrambles the error-correction-decoded data, and returns the data to the pre-scrambling bit string. The CRC unit 144 carries out the CRC-based error detection. The data, which are normal in terms of an error detection result of the CRC unit 144, are sent to the higher layer of the base station 10 and handed over to the scramble unit 146. A configuration leading to the CRC unit 144 from the demodulation unit 141 among these units may be said to be "a second demodulation circuit to execute a second demodulation" because of demodulating second reception signals being CPSK-modulated. Note that the reception signals to be demodulated at this time among the reception signals received by the antenna 19 are called the second reception signals.

The scramble unit 146, the error correction coding unit 147 and the CPSK modulation unit 148 perform again, based on the decoded data, scrambling, error-correction-coding and CPSK-modulating. The transmission data in the wireless terminals 4 transmitting the decoded data are thereby restored in the base station 10. The replica generation unit 149 multiplies, by the propagation path estimated values h, the transmission data restored by the CPSK modulation unit 148 as the transmission data generated in the wireless terminals 4, thereby generating the replicas of the CPSK signals received from the wireless terminals 4. In other words, the replica is defined as the signal simulating the CPSK modulated signal received by the antenna 19 and having the maximum electric power. The replica of the CPSK signal is herein termed "a second simulated signal". A configuration leading to the replica cancellation unit 149 from the scramble unit 146 may be said to be "a second generation circuit to execute a second-generation" because of generating the second simulated signal simulating the second reception signal, based on the demodulation signal demodulated by the second demodulation circuit.

The replica cancellation unit 18 cancels the replicas of the CPSK signals from the radio signals received by the antenna 19 in a second cancellation. As a result, in the example of FIG. 5, the simulated signals corresponding to the CPSK-modulated signals (second reception signals described above) having the maximum electric power are cancelled from the reception signals in the SIC loop. It may be said that the replica cancellation unit 18 executes extracting the signals obtained by cancelling the second simulated signals from the reception signals. It may also be said that the SIC loop is repeated, and hence the replica cancellation unit 18 cancels the second simulated signals from the extracted signals.

The CPSK demodulator 14 iterates the SIC loop till the data having no error in the error detection of the CRC unit 144 cannot be obtained from the reception signals. The CPSK demodulator 14 thus demodulates the CPSK reception signals from the signals into which the CPSK reception signals coming from the plurality of wireless terminals are mingled with the DPSK reception signals coming therefrom. To be specific, the CPSK demodulator 14 demodulates the CPSK reception signals coming from the individual wireless terminals 4 performing the CPSK-based communications, and hands over the demodulated signals to the higher layer of the base station 10. As described above, the controller 10C of the base station 10 includes the CPU. For instance, the CPU of the controller 10C executes the processes of the respective units of the CPSK demodulator 14, and controls the SIC loop. The CPU of the base station 10, which executes the processes by way of the CPSK demodulator 14, is also called "a second control circuit to repeat the processes" as the case may be. However, the CPSK demodulator 14 includes a CPU and may also control the SIC loop.

As in FIG. 5, the signals, obtained by cancelling the simulated signals corresponding to the CPSK modulated signals having the maximum electric power from the reception signals, are returned again to the SIC loop and also handed over to the DPSK demodulator 13. Thus, the DPSK demodulator 13 and the CPSK demodulator 14 execute the demodulation processes in parallel independently of each other, meanwhile, then return the SIC results to their own SIC loops and hand over the results to the counterpart demodulation units each other.

As described above, the replica cancellation unit 18 receives the replicas from the DPSK demodulator 13 and the CPSK demodulator 14 respectively, and cancels the replicas from the radio signals received by the antenna 19. In the first embodiment, the DPSK demodulator 13 and the CPSK demodulator 14 operate in parallel independently of each other, and demodulate the modulated signals sequentially from the signal exhibiting the highest signal-to-interference noise power ratio (SINR). When any error does not exist in any one of the CRC unit 134 of the DPSK demodulator 13 and the CRC unit 144 of the CPSK demodulator 14, the replica is generated on the side having no error, while the replica cancellation unit 18 cancels the interferences of the signals corresponding to the data demodulated with no error.

(Processing Flow)

Figure 6:
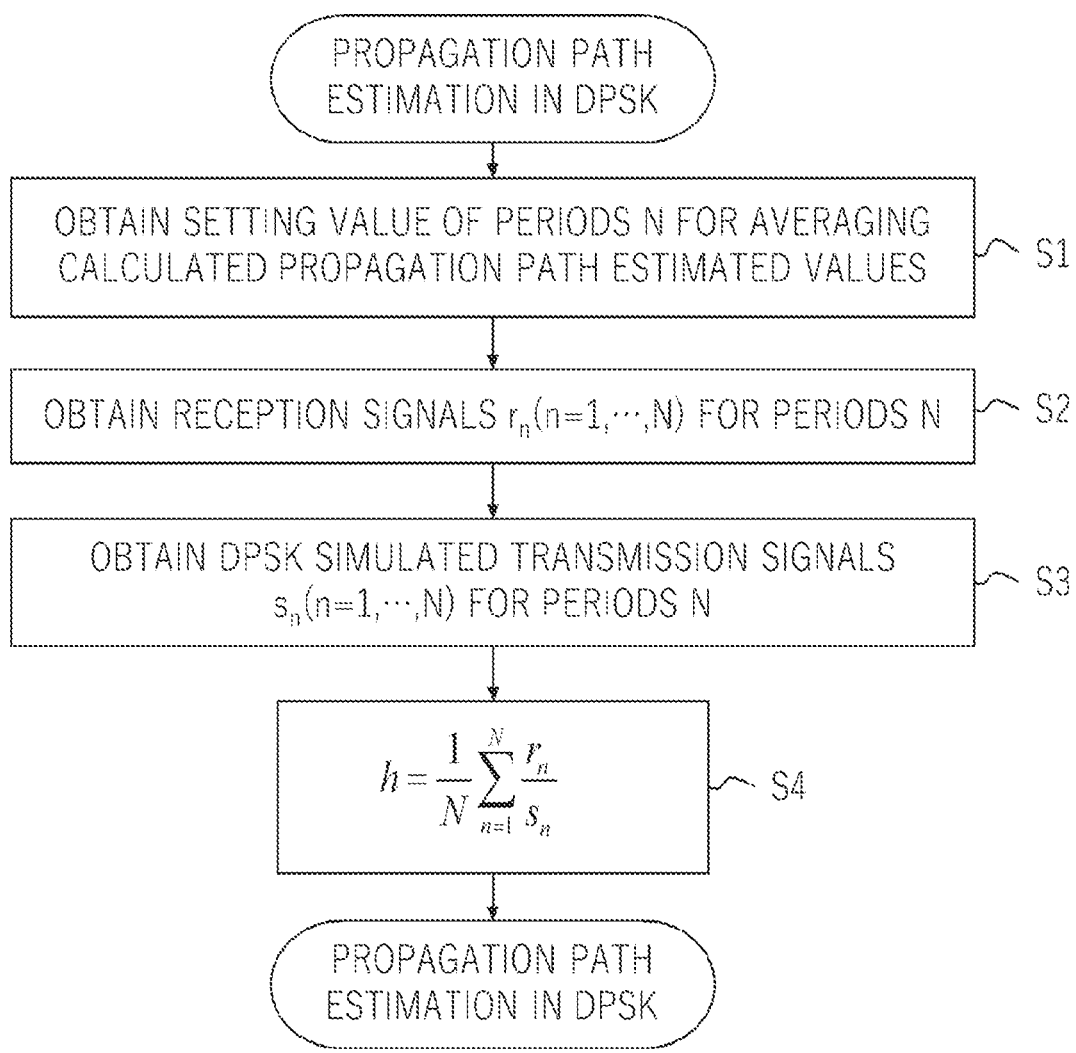
FIG. 6 is a diagram illustrating processes of a propagation path estimation unit of the DPSK demodulation unit.

FIG. 6 is a flowchart illustrating processes of the propagation path estimation unit 13B of the DPSK demodulator 13. It is now assumed that the wireless terminal 3 serving as a propagation path estimation target is designated as a wireless terminal 3-A. In this process, the propagation path estimation unit 13B estimates a propagation path between the wireless terminal 3-A now serving as the propagation path estimation target and the antenna 19 without using the reference signal. The propagation path estimation unit 13B therefore uses the reception signals into which the reception signals coming from the plurality of wireless terminals 3 including wireless terminal 3-A are mingled with the noises. The propagation path estimation unit 13B averages the propagation path estimated values in a plurality of periods in order to cancel the interference signals and the noises that are given from the wireless terminals 3-B and other wireless terminals exclusive of the wireless terminal 3-A serving as the propagation path estimation target.

Such being the case, to begin with, the propagation path estimation unit 13B obtains a setting value of a period N for averaging the calculated propagation path estimated values h (S1). The setting value of the period N may also be one of empirical values accumulated in the base station 10. The setting value of the period N may further be a value set by an administrator. The setting value of the period N may still further be a value set based on a variation rate and other equivalents (fading speed and other equivalents) with respect to time of the propagation path estimated value h, which is determined by the propagation path estimation unit 13B in the processes of FIG. 6.

The propagation path estimation unit 13B obtains reception signals $r_n$ (n=1, . . . , N) for an N-numbered periods from the memory (S2). The reception signals $r_n$ are the reception signals including the signals transmitted from the plurality of wireless terminals 3 inclusive of the wireless terminal 3-A in the respective periods (n–1, . . . , N) in the antenna 19 of the base station 10. The CPU of the base station 10, which executes the processes by way of the propagation path estimation unit 13B, saves the reception signals in the antenna 19 of the base station 10 on the memory for a predetermined period.

The propagation path estimation unit 13B obtains DPSK simulated transmission signals $s_n$ (n=1, . . . , N) for the N-numbered periods from the memory (S3). The DPSK simulated transmission signals $s_n$ are the DPSK modulated signals generated corresponding to the wireless terminal 3-A performing the DPSK-based communications, which are outputted by the DPSK modulation unit 138 in FIG. 4. The CPU of the base station 10, which executes the processes as the propagation path estimation unit 13B, saves the DPSK modulated signals outputted by the DPSK modulation unit 138 and generated corresponding to the wireless terminal 3-A on the memory for the predetermined period.

The propagation path estimation unit 13B calculates the propagation path estimated values $h_n = r_n / s_n$ (n=1, . . . , N) for the N-numbered periods, and further calculates an average value thereof (S4). With this calculation of the average value, the interference signals and the noises, which are contained in the reception signals $r_n$ (n=1, . . . , N) received by the antenna 19 and come from the terminals other than the wireless terminal 3-A being set now as the propagation path estimation target, are cancelled as random components. Averaging described above is one of statistical processes. It may be said that the propagation path estimation unit 13B serving as the estimation circuit executes the statistical processes about variations of an amplitudes and a phase of the propagation signals on the propagation path. The replica generation unit 139 may be said to execute generating the simulated signal on the basis of the statistically processed estimated value.

Modified Example

In the first embodiment, as illustrated in FIG. 3, the DPSK signals are not overlapped with the wireless resources of the reference signals for CPSK. With this configuration, the reference signals used for CPSK are not affected by the DPSK signals. In this case, it may be enough that the signal-to-interference noise power ratio (SINR) of the DPSK signal is larger than that of the CPSK signal when the DPSK signals are demodulated. Accordingly, the interferences of the DPSK signals need not to be cancelled before the base station 10 acquires the reference signals. It does not, however, mean that the base station 10 according to the embodiment is limited to these processes.

Figure 7:
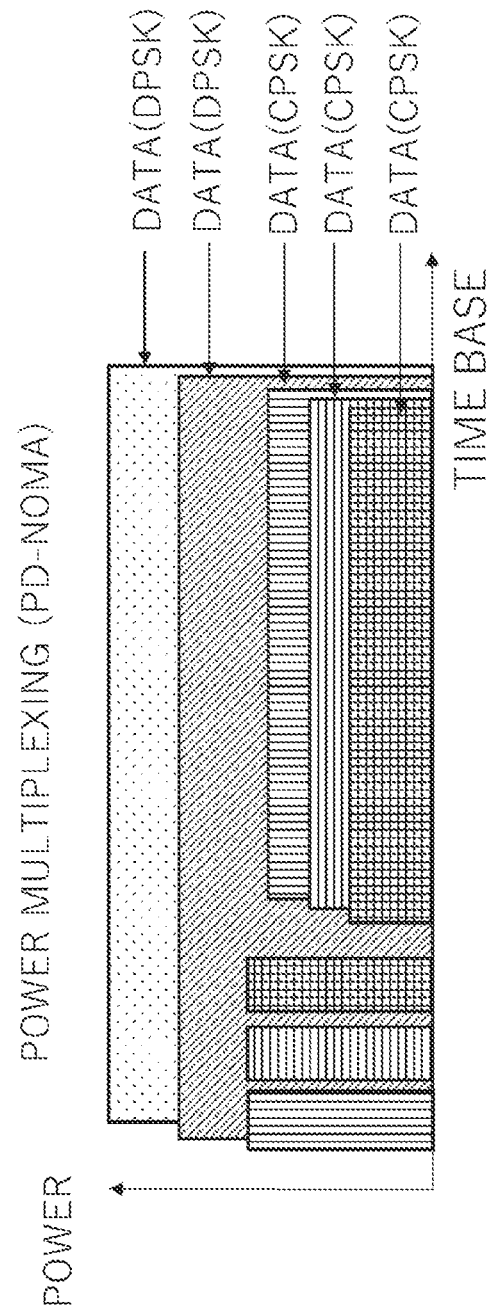
FIG. 7 is a diagram illustrating a configuration that DPSK signals are overlapped with the wireless resources for reference signals.

For example, as illustrated in FIG. 7, such a configuration is also available that the DPSK signals are overlapped with the wireless resources of the reference signals for CPSK. In this case, the base station 10 causes the respective wireless terminals 3, 4 to control the transmission power so that the DPSK signal in the base station 10 has the highest reception power in the wireless communication network configured by the wireless terminals 3, 4 and the base station 10. In other words, the base station 10 makes an arrangement to cancel the interference from the DPSK at first in the SIC loop explained in FIGS. 4 and 5. In the embodiment, with this setting of a radio signal intensity, the DPSK signal-caused-interference affecting the reference signal is cancelled previously by the SIC method. In consequence, as in FIG. 7, even in the configuration that the DPSK signals are overlapped with the wireless resources of the reference signals for CPSK, when the CPSK signals are demodulated, the interferences are cancelled, and the deteriorations of the CPSK demodulated signals are restrained.

In this case, it may be said that the DPSK signals received by the antenna 19 contain the reception signals in the resources overlapped with the reference signals (RS) for the CPSK modulated second reception signals. It may also be said that the DPSK signals received by the antenna 19 contain the DPSK modulated reception signals having the electric power exceeding the power of the reference signal (RS).

(Simulation Result)

Figure 9:
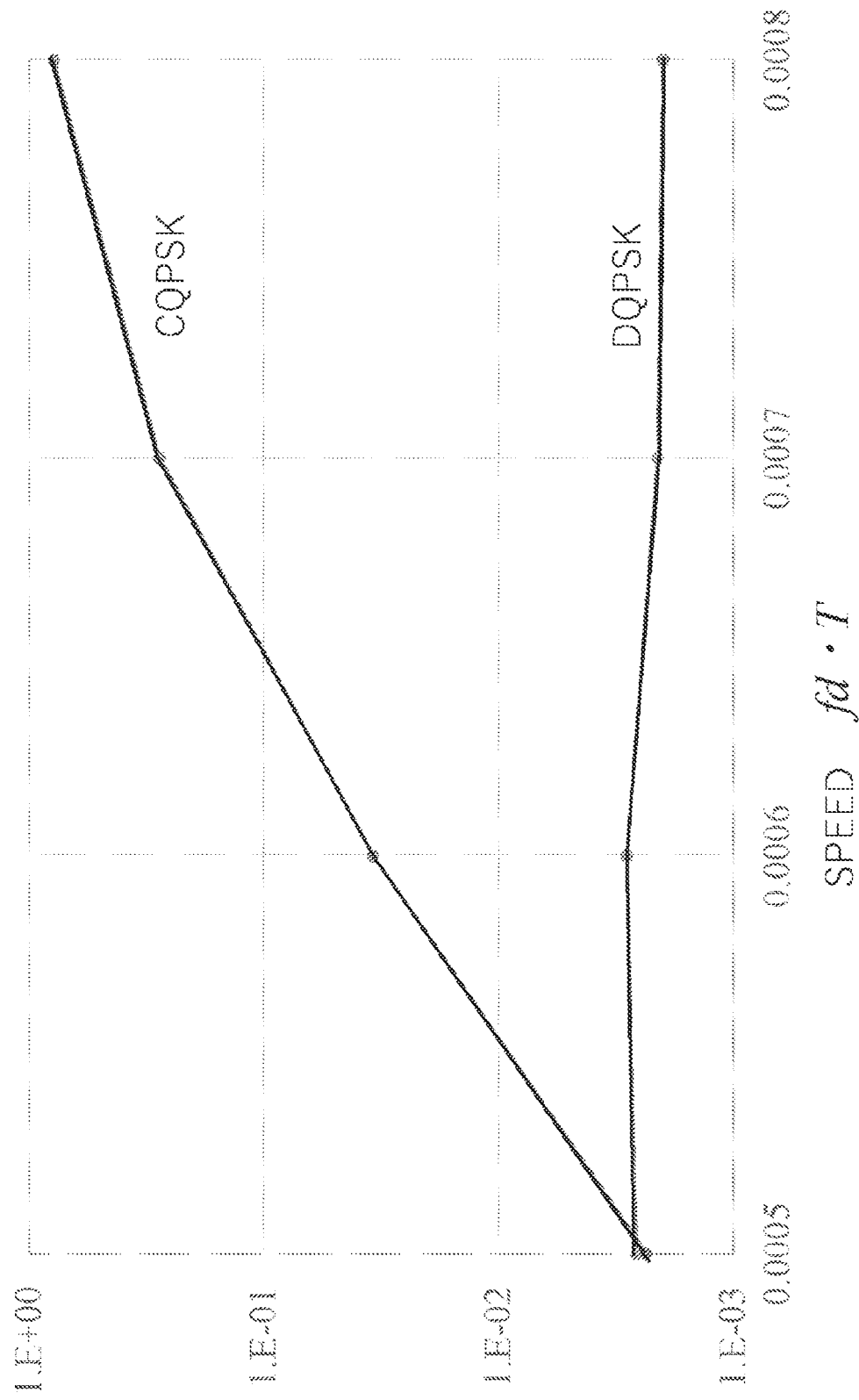
FIG. 9 is a graph depicting one example of simulation results.

FIGS. 8 through 11 depict simulation results by modelling the wireless communication system 100 according to the embodiment. FIGS. 8 and 9 illustrate examples of the simulations on the assumption that the wireless terminals 3, 4 move fast. FIG. 8 illustrates parameters set in the simulation. In this simulation, a number of the wireless terminals 3 and a number of the wireless terminals 4 are each "2" (totally "4"), and the modulation methods are a single carrier synchronous detection QPSK (Quadrature Phase Shift Keying) (CQPSK: Continuous QPSK) method and a single carrier differential coding QPSK (DQPSK: Differential QPSK) method. The error correction code is herein a convolutional code, of which a constraint length is "6" and a coded rate is 1/3. An inter-terminal power ratio (SIR) is "3 dB". A moving speed is given such as fdT=0.0005~0.0008, in which fd is a maximum doppler frequency, and T is a symbol period. For instance, when one symbol length is 1 microsecond, the maximum doppler frequency is given such as fd=500~800 Hz. The signal-to-noise power ratio (SNR) is 30 dB, and an information bit number is 128 bits.

The simulation is that the propagation path estimated values $h_n = r_n / s_n$ (n=1, 2, 3, . . . , 20) are averaged and thus estimated without the reference signals in DQPSK. Specifically, the propagation path estimated values $h_n$ are averaged in 20 symbol intervals.

FIG. 9 illustrates one example of the simulation results. As in FIG. 9, a packet error rate increases with a rise in moving speed of each of the wireless terminals 3, 4 in CQPSK. While on the other hand, the result is that the increase in packet error rate is restrained in DQPSK.

Figure 11:
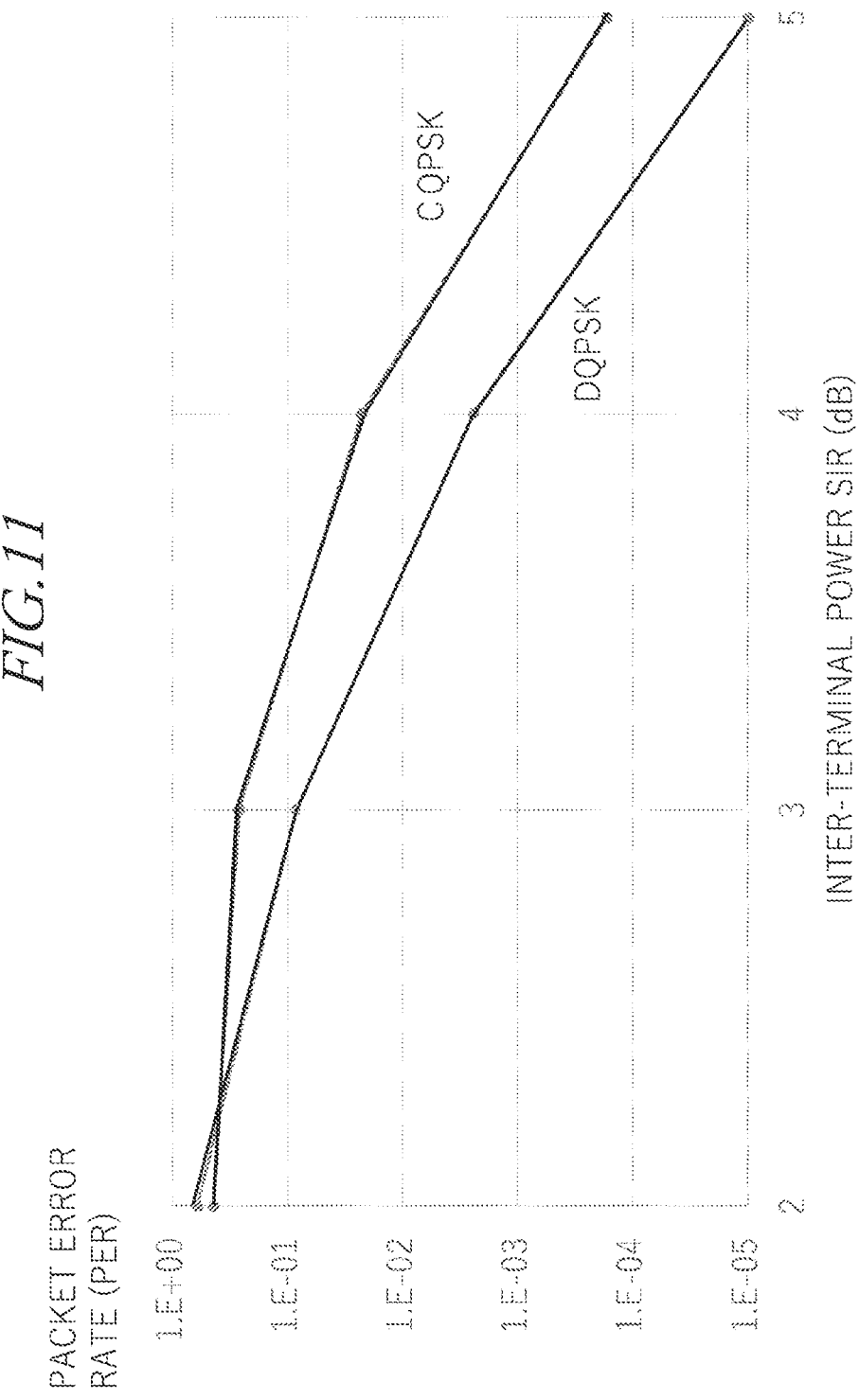
FIG. 11 is a graph depicting one example of the simulation results.

FIGS. 10 and 11 are a chart and a graph illustrating simulation examples given when the reference signals (RS) collide with each other between the two wireless terminals 4. FIG. 10 illustrates parameters set in the simulation. In this simulation, the wireless terminals 3, 4 stay static. The inter-terminal power ratio SIR varies in a range of 2~5 dB. Other parameters are the same as those in the case of FIG. 8. In the case of CQPSK, the initial propagation path estimated value h is given such as h=h$_1$+h$_2$, in which h$_1$ and h$_2$ are two estimated values calculated by using the collided reference signals RS. With respect to the propagation path estimations in the second and subsequent SIC loops, the propagation path estimated values h$_n$=r$_n$/s$_n$ (n=1, 2, 3, . . . , 20) are averaged and thus estimated in the same way as DQPSK in FIG. 9.

FIG. 11 illustrates the simulation results. In the results of this simulation also, generally the packet error rate in DQPSK is smaller than the packet error rate in CQPSK. However, when the power SIR among the four wireless terminals 3, 4 becomes approximately 2 dB, the result is that the packet error rate of CQPSK is lower that the packet error rate of DQPSK.

Effects of First Embodiment

As discussed above, the base station 10 according to the embodiment estimates the propagation path by using the reception signals mingled with the transmission signals coming from the plurality of wireless terminals 3 without receiving the reference signals in the DPSK-based reception. In other words, the base station 10 restores the DPSK modulated signals generated based on the decoded data from the reception signals coming from the respective wireless terminals 3. The base station 10 calculates the propagation path estimated value between the base station 10 and each of the wireless terminals 3 on the basis of the reception signals mingled with the transmission signals coming from the plurality of wireless terminals 3 and the restored DPSK modulated signals (FIG. 6). The base station 10 generates, based on this propagation path estimated value h, the replica defined as the simulated signal of the reception signal received from each of the wireless terminals 3. With the generated replica, the base station 10 executes the SIC process about each of the reception signals coming from the plurality of wireless terminals 3 performing the DPSK-based communications, and is thereby enabled to extract the reception signals coming from the individual wireless terminals 3 from the signals mingled with the reception signals coming from the plurality of wireless terminals 3.

In this case, the base station 10, as in FIG. 6, calculates the propagation path estimated values h$_n$=r$_n$/s$_n$ (n=1, . . . , N) for the N-numbered periods, and calculates an average value of these estimated values. The base station 10 is therefore enabled to cancel the random components of the interference signals and the noises given from the wireless terminals 3 excluding the estimation target wireless terminal 3-A.

As described above, the base station 10 enables the simultaneous connections to be established between the base station 10 and both of the wireless terminals 3 performing the DPSK-based communications and the wireless terminals 4 performing the CPSK-based communications, and also enables the DPSK and CPSK advantages to be combined.

Namely, the following are feasible by performing the DPSK-based communications.
(1) The wireless resources for the reference signals are not required. The reference signals need being orthogonal, and CPSK consumes a large quantity of wireless resources for the reference signals. While on the other hand, DPSK does not require the reference signals. The wireless resources for the reference signals can be thereby allocated to DATA.
(2) It is possible to reduce the influences caused by the propagation path estimation errors due to the fast fading. DPSK does not require the propagation path estimation using the reference signals, and the influences of the fast fading are reduced.
(3) DPSK makes the low delay feasible. To be specific, DPSK enables the transmission without any negotiations between the base station and the terminals for allocating the reference signals. Consequently, there is no communication delay caused by the negotiations.

The following are feasible by CPSK.
(1) The transmission terminals can be grasped in CPSK. To be specific, CPSK enables the base station to grasp the number and IDs of the connected transmission terminals before the demodulation from the received reference signals.
(2) It is possible to decrease the signal-to-interference noise power ratio (SINR) in order to obtain the same bit error rate in CPSK. In other words, CPSK is higher in tolerance against the noises than DPSK. It is therefore feasible to increase the number of terminals that can be overlapped.
(3) CPSK facilitates the generation of the replica. In the case of CPSK, the propagation path estimated values are obtained from the reference signals, and hence the replicas are easily generated.

Second Embodiment

The base station 10 according to the first embodiment includes the DPSK demodulator 13 and the CPSK demodulator 14 that operate in parallel independently of each other. Taking the power efficiency into consideration, however, the base station 10 may cause the DPSK demodulator 13 and the CPSK demodulator 14 to operate in a way that switches over the DPSK demodulator 13 and the CPSK demodulator 14, corresponding to conditions.

The base station 10 may cause, for example, the DPSK demodulator 13 and the CPSK demodulator 14 to operate by switching over these units 13 and 14 corresponding to requests given when connecting the wireless terminals 3, 4. The processes excluding the above mentioned processes done by the base station 10 and the wireless terminals 3, 4 according to a second embodiment as switching over the DPSK demodulator 13 and the CPSK demodulator 14 are the same as those of the base station 10 and the wireless terminals 3, 4 according to the first embodiment. Such being the case, the configurations in FIGS. 2 through 7 are to be applied directly to the second embodiment, and processes different from those in the first embodiment will hereinafter be described.

Figure 12:
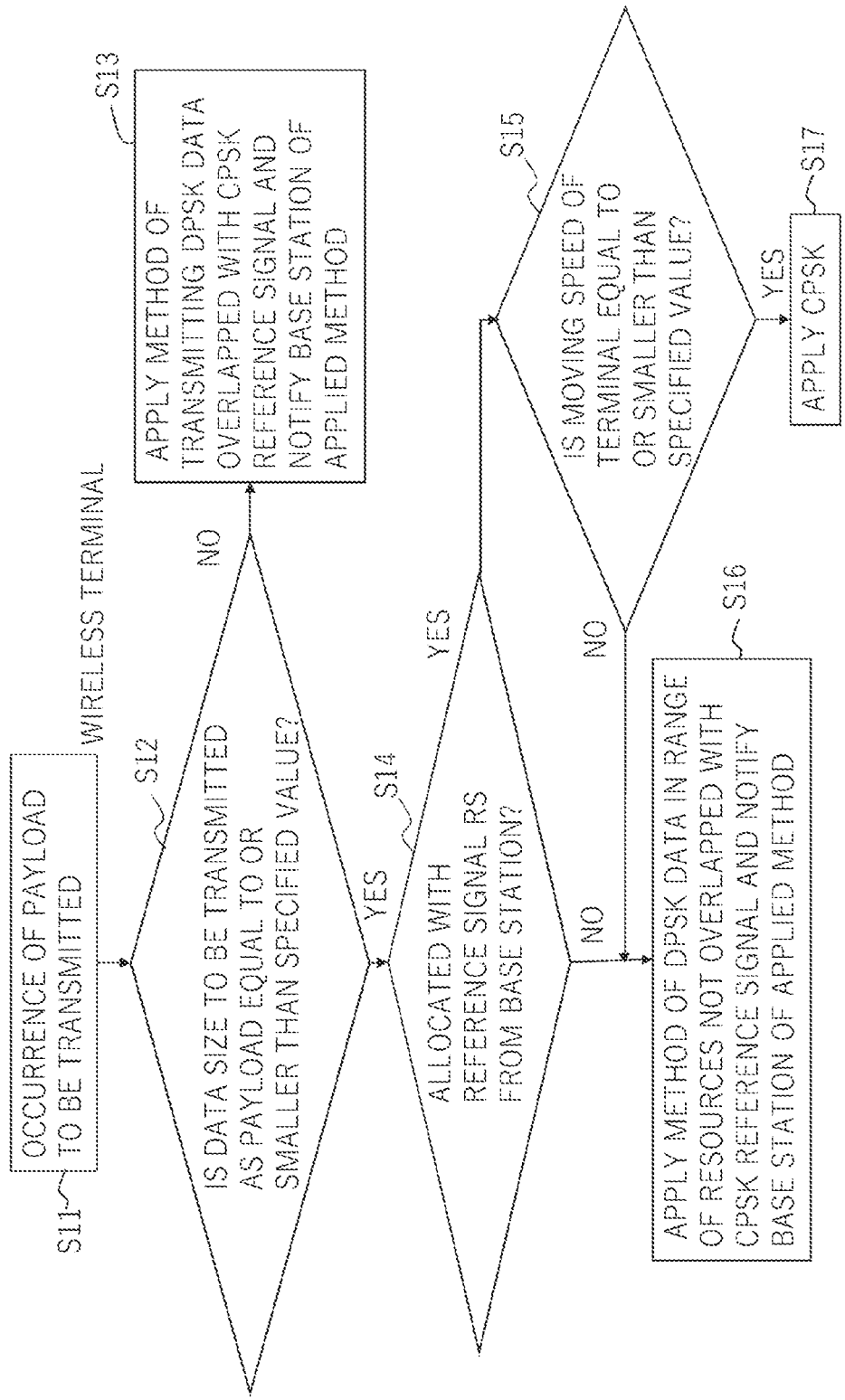
FIG. 12 is a flowchart illustrating processes in which a wireless terminal determines a modulation method.

FIG. 12 is a flowchart illustrating processes of how the wireless terminals 3,4 determine the modulation method. The processes in FIG. 12 are executed by the CPU of each of the wireless terminals 3, 4 with the aid of the computer programs stored on the memory but will herein be described as the processes to be executed by the wireless terminals 3, 4.

A case assumed in these processes is that payloads to be transmitted occur in the wireless terminals 3, 4 (S11). The wireless terminals 3, 4 determine whether a data size to be transmitted as the payload is equal to or smaller than a specified value (S12). When the data size to be transmitted as the payload is equal to or larger than the specified value (NO in S12), the wireless terminals 3, 4 select the method of transmitting the DPSK data overlapped with the CPSK reference signals (RS), and notify the base station 10 of the selected method (S13). The wireless terminals 3, 4 are thereby enabled to transmit the DPSK data in a way that exploits the resources of the reference signals (RS). Accordingly, when the data size is equal to or larger than the specified value, the transmission on the uplink can be accomplished by using the wireless resources efficiently.

Whereas when the data size to be transmitted as the payload is equal to or smaller than the specified value (YES in S12), the wireless terminals 3, 4 determine whether the base station 10 has already allocated the reference signals (RS) to the wireless terminals 3, 4 (S14). When the wireless terminals 3, 4 have not been allocated with the reference signals (RS) from the base station 10 (NO in S14), the wireless terminals 3, 4 apply the method of transmitting the DPSK data in a range of the resources not overlapped with the CPSK reference signals, and notify the base station 10 of this applied method. The wireless terminals 3, 4 are thereby enabled to transmit the DPSK data quickly in a short period of time without requiring the time for receiving the resources for the reference signals (RS). In this case, the data size is equal to or smaller than the specified value, and hence there is no necessity for using the wireless resources overlapped with those for the reference signals.

The wireless terminals 3, 4, when already allocated with the reference signals (RS) from the base station 10 (YES in S14), calculate the moving speeds of the wireless terminals 3, 4 themselves by using Global Positioning System (GPS) and other equivalent systems. The wireless terminals 3, 4 determine whether the moving speed is equal to or smaller than a specified value (S15). When the moving speed is equal to or larger than the specified value (NO in S15), the wireless terminals 3, 4 apply the method of transmitting the DPSK data in a range of the resources not overlapped with the CPSK reference signals, and notify the base station 10 of this applied method (S16). The wireless terminals 3, 4 are thereby enabled to transmit the DPSK data in a way that restrains the influences of the fast fading quickly in the short period of time.

When the moving speed is equal to or smaller than the specified value (YES in S15), the wireless terminals 3, 4 select the method of transmitting the CPSK data and notify the base station 10 of this selected method (S17). The wireless terminals 3, 4 are thereby enabled to transmit the uplink data efficiently while decreasing SIR of the electric power. As a result, the multiplicity of wireless terminals 3, 4 can be connected to the base station 10.

Note that the second embodiment exemplifies the process that the wireless terminals 3, 4 select DPSK and CPSK corresponding to the conditions and notify the base station 10 as in FIG. 12. It does not, however, mean that the wireless communication system 100 according to the second embodiment is limited to the processes described above. For instance, the base station 10 may switch over the DPSK-based communication method and the CPSK-based communication method on the basis of the moving speeds of the wireless terminals 3, 4 and the data transmission/reception loads.

Figure 13:
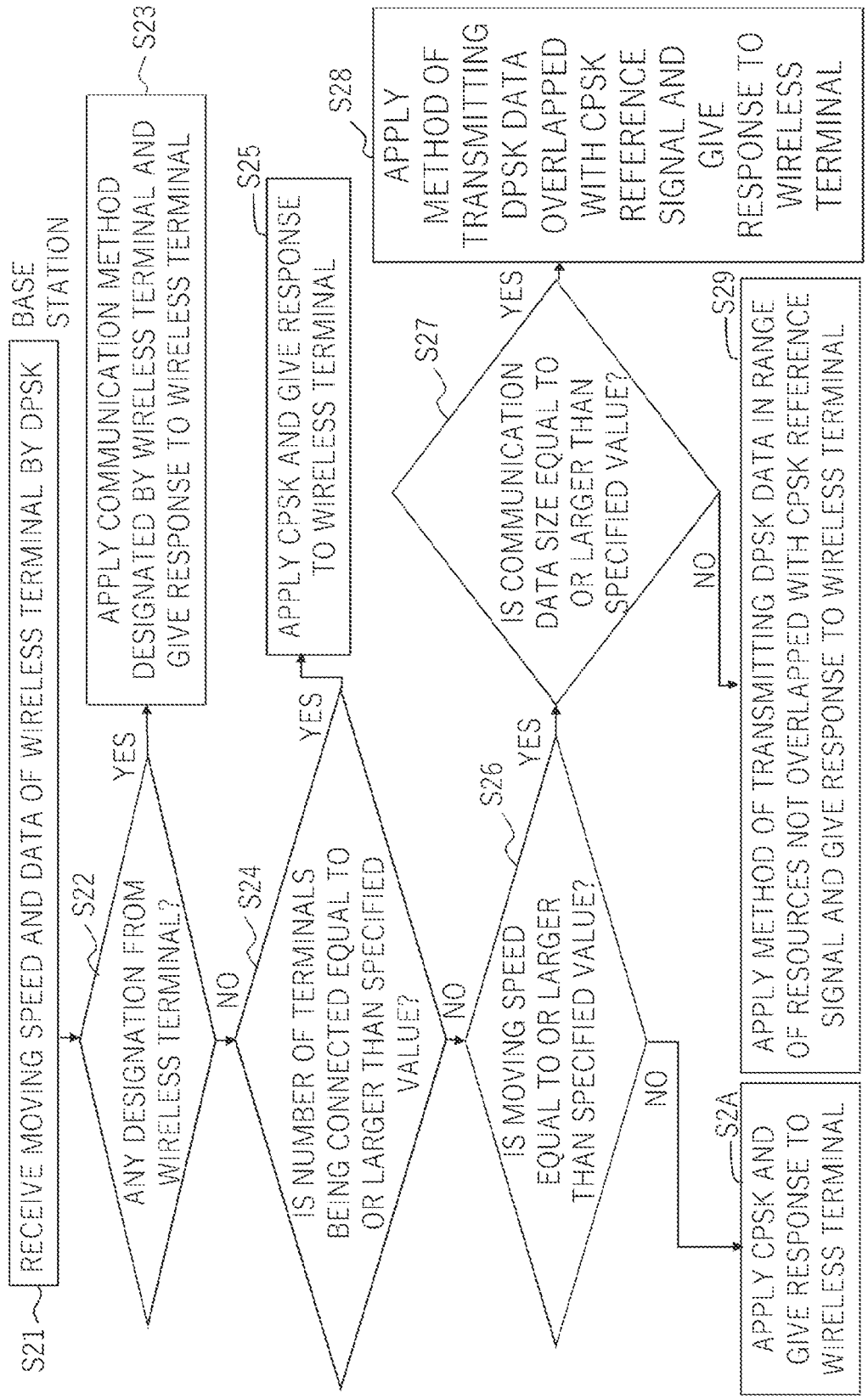
FIG. 13 is a flowchart illustrating processes of switching over a DPSK communication method and a CPSK communication method in the base station.

FIG. 13 illustrates processes of switching over the DPSK-based communication method and the CPSK-based communication method. These processes are executed by the controller 10C (see FIG. 2) of the base station 10 with the aid of the computer programs by way of one example but will be described as the processes to be executed by the base station 10. An assumption in these processes is that the base station 10 performs, at first, the DPSK-based communications with the wireless terminals 3, 4. It does not, however, mean that the processes of the base station 10 in FIG. 13 are limited to the case of performing the DPSK-based communications earlier than CPSK. The base station 10 may also perform, at first, the CPSK-based communications with the wireless terminals 3, 4.

It is now presumed that the base station 10 DPSK-receives the moving speed and the data from the wireless terminal 3-A (S21). To begin with, the base station 10 determines whether the wireless terminal 3-A designates the communication method (S22). When the wireless terminal 3-A designates the communication method (YES in S22), the base station 10 applies the communication method designated by the wireless terminal 3-A. Specifically, the base station 10 switches over DPSK and CPSK in accordance with the designation made by the wireless terminal 3-A, or keeps the current communication method in accordance with the designation. Then, the base station 10 gives a response to the wireless terminal 3-A (S23). It is therefore said that the CPU serving as the controller 10C of the base station 10 operates any one of the DPSK demodulator 13 defined as the first demodulation circuit and the CPSK demodulator 14 defined as the second demodulation circuit but stops the other in accordance with the designations given from the plurality of the wireless terminals 3, 4 as the transmission devices.

Whereas when no designation is made by the wireless terminal 3-A, the base station 10 determines whether the number of wireless terminals being connected at the present is equal to or larger than a specified value. When the number of wireless terminals being connected at the present is equal to or larger than the specified value, the base station 10 applies CPSK. To be specific, the base station 10 takes the CPSK-based communication method and gives the response to the wireless terminals 3-A (S25). By the CPSK-based communication method, there is an increased possibility of connecting a much larger number of wireless terminals 3, 4.

When the number of wireless terminals being connected at the present is equal to or smaller than the specified value, the base station 10 determines whether the moving speed, received in S21, of the wireless terminal 3-A is equal to or larger than the specified value (S26). When the moving speed is equal to or larger than the specified value (YES in S26), the base station 10 determines whether the communication data size from the wireless terminal 3-A is equal to or larger than a specified value (S27). The base station 10 estimates the communication data size from the wireless terminal 3-A, based on, e.g., values of past records for a predetermined period. When the communication data size is equal to or larger than the specified value, the base station 10 selects the method of transmitting the DPSK data overlapped with the CPSK reference signals (RS), and notifies the wireless terminal 3-A of the selected method (S28). The base station 10 is thereby enabled to receive the DPSK data by exploiting the wireless resources for the reference signals. Whereas when the communication data size is equal to or smaller than the specified value, the base station 10 applies the method of transmitting the DPSK data in the range of the resources not overlapped with the CPSK reference signals, and notifies the wireless terminal 3-A of the applied method (S29). The base station 10 is thereby enabled to receive the DPSK data without any interferences on the reference signals.

Whereas when the moving speed is equal to or smaller than the specified value (NO in S26), the base station 10 switches over the communication method to CPSK from DPSK, and gives a response to the wireless terminal 3-A (S2A).

By the processes described above, It is said that the CPU serving as the controller 10C of the base station 10 carries out the control corresponding to the communication conditions of the plurality of transmission devices and the demodulating apparatus. It is said that the base station 10 operates any one of the DPSK demodulator 13 defined as the first demodulation circuit and the CPSK demodulator 14 defined as the second demodulation circuit but stops the other.

As discussed above, according to the second embodiment, the base station 10 is enabled to receive the uplink communications from the wireless terminals 3, 4 by properly switching over DPSK and CPSK, corresponding to the communication condition of the base station itself, and the conditions and the moving speeds of the wireless terminals 3, 4.

<Hardware Configuration>

Figure 14:
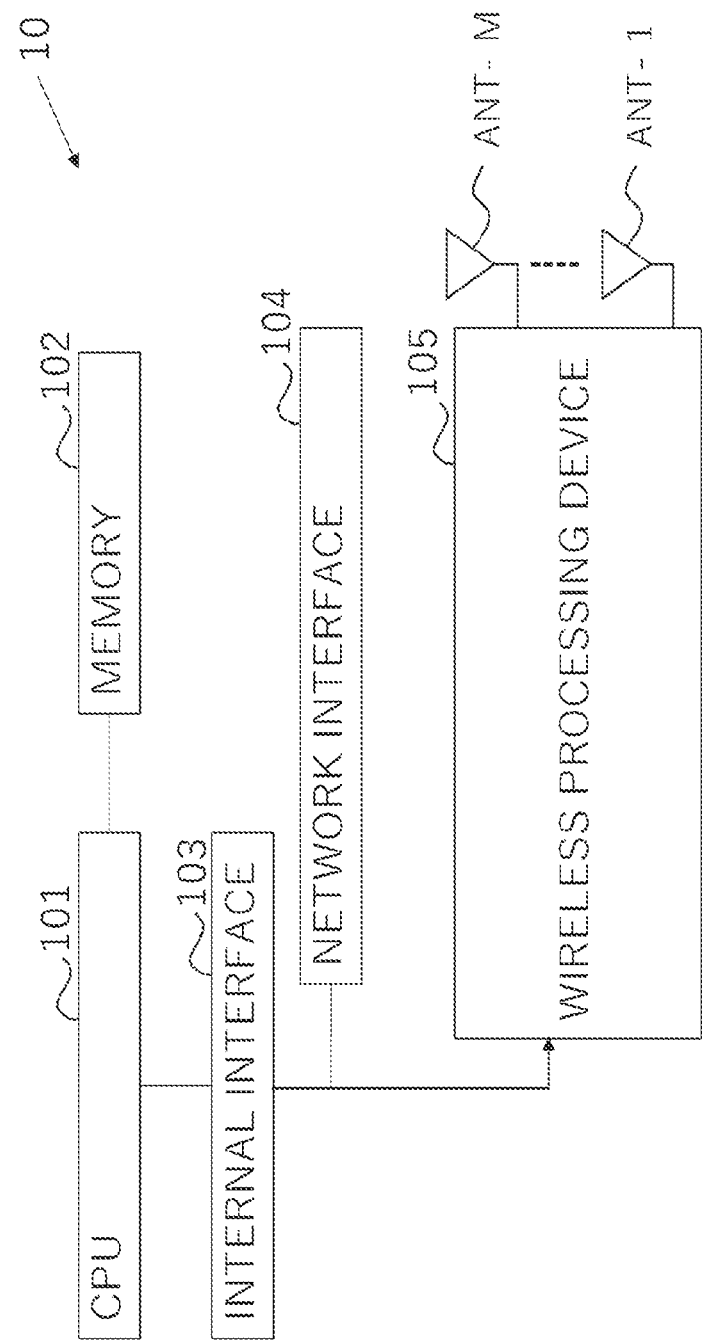
FIG. 14 is a diagram illustrating a hardware configuration of the base station.

FIG. 14 is a diagram illustrating a hardware configuration of the base station 10 exemplified in the first and second embodiments. The base station 10 includes a CPU 101, a memory 102, an internal interface 103, a network interface 104 for performing the communications with other base stations, and a wireless processing device 105.

The CPU 101 is also called a processor and a Microprocessor Unit (MPU). It does not mean that the CPU 101 is limited to a single processor, and the CPU 101 may take a multiprocessor configuration. The CPU 101 may also be such that a single physical CPU connected by a single socket has a multicore configuration. The CPU 101 may include arithmetic devices having a variety of circuit configurations such as a Digital Signal Processor (DPS) and a Graphics Processing Unit (GPU). The CPU 101 may also be configured to cooperate with an Integrated Circuit (IC) and other digital circuits or analog circuits. The IC may also be a circuit including an LSI, an Application Specific Integrated Circuit (ASIC) and a programmable logic device (PLD). The PLD may also be a device including, e.g., a Field-Programmable Gate Array (FPGA). The CPU 101 may therefore be a unit called such as a microcontroller (MCU), an SoC (System-on-a-chip), a system LSI and a chipset.

The memory 102 stores command strings (computer programs) executed by the CPU 101 or the data processed by the CPU 101. The CPU 101 and the memory 102 are called a baseband unit (BBU) as the case may be. The internal interface 103 is a circuit for connecting a variety of peripheral devices to the CPU 101. The BBU can be also said to be a controller or a control circuit. The CPU 101 executes, e.g., the processes illustrated in FIG. 13. Accordingly, the CPU 101 may switch over the processes in accordance with the designations given from the wireless terminals 3, 4 as the plurality of transmission devices and the communication conditions of the plurality of wireless terminals 3,4 and the base station 10. In other words, the CPU 101 may execute the processes as the controller or the control circuit that operates any one of the DPSK demodulator 13 defined as the first demodulation circuit and the CPSK demodulator 14 defined as the second demodulation circuit but stops the other, corresponding to the communication conditions thereof.

The CPU 101 may execute the processes illustrated in FIGS. 4 and 5. Specifically, the CPU 101 may execute first processes to such a limit as to enable the DPSK demodulator 13 defined as the first demodulation circuit to demodulate, or may execute second processes to such a limit as to enable the CPSK demodulator 14 defined as the second demodulation circuit to demodulate. The first processes are herein the processes of the differential demodulation unit 131 through the CRC unit 134, the processes of the scramble unit 136 through the replica generation unit 139, and the processes of the propagation path estimation unit 13B serving as the estimation circuit and the replica cancellation unit 18 as the cancellation circuit illustrated in FIG. 4. The second processes are the processes of the demodulation unit 141 through the CRC unit 144, the processes of the scramble unit 146 through the replica generation unit 149, and the process of the replica cancellation unit 18 illustrated in FIG. 5.

Note that the CPU 101 may be provided in, e.g., each of the DPSK demodulator 13 and the CPSK demodulator 14 in FIGS. 4 and 5. The CPU 101 may also be provided in, e.g., a portion common to the DPSK demodulator 13 and the CPSK demodulator 14 so as to control both of the DPSK demodulator 13 and the CPSK demodulator 14 in FIGS. 4 and 5. The CPU 101 may be therefore said to be a first control circuit to repeat the processes of the DPSK demodulator 13 defined as the first demodulation circuit to such a limit as to enable the DPSK demodulator 13 as the first demodulation circuit to demodulate. The CPU 101 may also be said to be a second control circuit to repeat the processes of the CPSK demodulator 14 to such a limit as to enable the CPSK demodulator 14 as the second demodulation circuit to demodulate.

The network interface 104 is a communication device used for the base station 10 to access the network connecting with other base stations. The network connecting with other base stations is called a backhaul. The backhaul is exemplified by a cable network in optical communications.

The wireless processing device 105 includes a transceiver to transmit the radio signals and a receiver to receive the radio signals, and is connected to antennas ANT-1, . . . ANT-M. The wireless processing device 105 may include M-numbered lines of transceivers and M-numbered lines of receivers, which are respectively the same as the number of antennas ANT-1, . . . ANT-M. The wireless processing device 105 may also be configured as a so-called remote radio head (RRH) that is remotely installed by being connected to a baseband device via the cable network in the optical communications. Such a configuration is also available that the plural RRHs are connected to one baseband device. The network, which connects the baseband device to the RRH is also called a fronthaul. The plurality of antennas ANT-1, . . . ANT-M is provided in FIG. 14, and, however, only one antenna ANT-1 may also be provided. Note that "M" of the antennas ANT-M is an integer number, in which the number of antennas is not limitative. The antennas ANT-1, . . . ANT-M connected to the wireless processing device 105 may be said to be one example of the reception circuit. Note that each of the wireless terminals 3, 4 also includes the processor, the memory, the wireless processing device and the antenna.

What is claimed is:

1. A demodulating apparatus comprising:
   a reception circuit to receive modulated radio signals coming from a plurality of transmission devices;
   a first demodulation circuit to demodulate a first reception signal modulated based on differential phase shift keying among the modulated radio signals received by the reception circuit;
   a second demodulation circuit to demodulate a second reception signal modulated based on coherent phase shift keying among the modulated radio signals received by the reception circuit; and
   a control circuit,
   wherein the control circuit calculates a moving speed of the demodulating apparatus, operates the first demodulation circuit when the moving speed is equal to or larger than a specified value, operates the second demodulation circuit when the moving speed is less than the specified value, and notifies one of the plurality of transmission devices of an operation of the first demodulation circuit or the second demodulation circuit.

2. The demodulating apparatus according to claim 1, further comprising:
a modulation circuit to modulate a first demodulation signal demodulated by the first demodulation circuit into a modulation signal based on differential phase shift keying;
an estimation circuit to estimate variations of an amplitude and a phase of a propagation signal on a propagation path leading to the reception circuit from one of the plurality transmission devices on the basis of the modulated radio signal received and the modulation signal modulated by the modulation circuit;
a first generation circuit to generate, based on the variations estimated by the estimation circuit, a first simulated signal simulating the first reception signal from the modulation signal;
a second generation circuit to generate, based on a second demodulation signal demodulated by the second demodulation circuit, a second simulated signal simulating the second reception signal; and
a cancellation circuit to extract a signal obtained by cancelling the first simulated signal or the second simulated signal from the modulated radio signals received by the reception circuit;
wherein the control circuit repeats first processes of the first demodulation circuit, the modulation circuit, the estimation circuit, the first generation circuit and the cancellation circuit to such a limit as to enable the first demodulation circuit to demodulate, or second processes of the second demodulation circuit, the second generation circuit and the cancellation circuit to such a limit as to enable the second demodulation circuit to demodulate in accordance with the designations given respectively from the plurality of transmission devices or the communication conditions of the plurality of transmission devices and the demodulating apparatus.

3. The demodulating apparatus according to claim 2, wherein the estimation circuit statistically processes estimation values of the variations, the estimation values being estimated for each of a plurality of predetermined periods, and
the first generation circuit generates the first simulated signal on the basis of the statistically processed estimation values.

4. The demodulating apparatus according to claim 1, wherein the modulated radio signals received by the reception circuit include the first reception signal modulated based on differential phase shift keying and having electric power exceeding electric power of a reference signal in resources overlapped with the reference signal for the second reception signal modulated based on coherent phase shift keying.

5. A base station comprising:
a receiver including:
a reception circuit to receive modulated radio signals coming from a plurality of transmission devices;
a first demodulation circuit to demodulate a first reception signal modulated based on differential phase shift keying among the modulated radio signals received by the reception circuit;
a second demodulation circuit to demodulate a second reception signal modulated based on coherent phase shift keying among the modulated radio signals received by the reception circuit;
a transmitter to transmit radio signals to the plurality of transmission devices; and
a control circuit,
wherein the control circuit receives a moving speed of one of the plurality of transmission devices from the one of the plurality of transmission devices via the first demodulation circuit, switches over a communication method by operating the second demodulation circuit and stopping the first demodulation circuit when the moving speed of the one of the plurality of transmission devices is smaller than a specified value, and gives a response to the one of the plurality of transmission devices.

6. The base station according to claim 5, further comprising:
a modulation circuit to modulate a first demodulation signal demodulated by the first demodulation circuit into a modulation signal based on differential phase shift keying;
an estimation circuit to estimate variations of an amplitude and a phase of a propagation signal on a propagation path leading to the reception circuit from one of the plurality transmission devices on the basis of the modulated radio signal received and the modulation signal modulated by the modulation circuit;
a first generation circuit to generate, based on the variations estimated by the estimation circuit, a first simulated signal simulating the first reception signal from the modulation signal;
a second generation circuit to generate, based on a second demodulation signal demodulated by the second demodulation circuit, a second simulated signal simulating the second reception signal; and
a cancellation circuit to extract a signal obtained by cancelling the first simulated signal or the second simulated signal from the modulated radio signals received by the reception circuit;
wherein the control circuit repeats first processes of the first demodulation circuit, the modulation circuit, the estimation circuit, the first generation circuit and the cancellation circuit to such a limit as to enable the first demodulation circuit to demodulate, or second processes of the second demodulation circuit, the second generation circuit and the cancellation circuit to such a limit as to enable the second demodulation circuit to demodulate in accordance with the designations given respectively from the plurality of transmission devices or the communication conditions of the plurality of transmission devices and the demodulating apparatus.

7. The base station according to claim 6, wherein the estimation circuit statistically processes estimation values of the variations, the estimation values being estimated for each of a plurality of predetermined periods, and
the first generation circuit generates the first simulated signal on the basis of the statistically processed estimation values.

8. The base station according to claim 5, wherein the modulated radio signals received by the reception circuit include the first reception signal modulated based on differential phase shift keying and having electric power exceeding electric power of a reference signal in resources overlapped with the reference signal for the second reception signal modulated based on coherent phase shift keying.

9. A demodulating method executed by a demodulating apparatus, comprising:
- receiving modulated radio signals coming from a plurality of transmission devices;
- calculating a moving speed of the demodulating apparatus;
- demodulating a first reception signal modulated based on differential phase shift keying among the modulated radio signals into a first demodulation signal when the moving speed is equal to or larger than a specified value;
- demodulating a second reception signal modulated based on coherent phase shift keying among the modulated radio signals into a second demodulation signal when the moving speed is less than the specified value; and
- notifying one of the plurality of transmission devices of a type of demodulating among the first demodulating and the second demodulating.

10. The demodulating method according to claim 9, further comprising:
- modulating the first demodulation signal into a modulation signal based on differential phase shift keying;
- estimating variations of an amplitude and a phase of a propagation signal on a propagation path leading to the demodulating apparatus from one of the plurality of transmission device on the basis of the modulated radio signal and the modulation signal;
- first generating, based on the variations estimated, a first simulated signal simulating the first reception signal from the modulation signal;
- second generating, based on the second demodulation signal, a second simulated signal simulating the second reception signal;
- extracting a signal obtained by cancelling the first simulated signal or the second simulated signal from the modulated reception signals; and
- repeating any one of:
- a first process of the first demodulating, the modulating, the estimating, the first generating and the extracting to such a limit as to enable first demodulation by the first demodulating; and
- a second process of the second demodulating, the second generating and the extracting to such a limit as to enable second demodulation by the second demodulating;
- in accordance with the designations given respectively from the plurality of transmission devices or the communication conditions of the plurality of transmission devices and the demodulating apparatus.

11. The demodulating method according to claim 10, wherein the estimating includes statistically processing estimation values of the variations, the estimation values being estimated for each of a plurality of predetermined periods, and
the first generating includes generating the first simulated signal on the basis of the statistically processed estimation values.

12. The demodulating method according to claim 9, wherein the modulated radio signals received include the first reception signal modulated based on differential phase shift keying and having electric power exceeding electric power of a reference signal in resources overlapped with the reference signal for the second reception signal modulated based on coherent phase shift keying.

* * * * *